United States Patent
Yamagishi et al.

(10) Patent No.: US 6,298,730 B1
(45) Date of Patent: Oct. 9, 2001

(54) PRESSURE SENSOR

(75) Inventors: Kouzou Yamagishi; Toshiaki Okumura; Yoji Serizawa; Haruhiko Sekiya; Takayuki Yokoyama; Yasutaka Ide; Ikuya Miyahara; Yasuo Watanabe; Shuzi Tohyama; Hayato Kobayashi, all of Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 09/208,689

(22) Filed: Dec. 10, 1998

(30) Foreign Application Priority Data

| Dec. 11, 1997 | (JP) | 9-341228 |
| Jan. 14, 1998 | (JP) | 10-005589 |
| Jan. 20, 1998 | (JP) | 10-008731 |
| Feb. 19, 1998 | (JP) | 10-037202 |

(51) Int. Cl.[7] ............................................. G01L 9/00
(52) U.S. Cl. ............................................................ 73/723
(58) Field of Search .............................. 73/723, 718, 724, 73/715, 720, 721, 722, 726, 728, 733, 756; 361/283, 283.4, 776; 174/267; 439/700, 83, 78, 862

(56) References Cited

U.S. PATENT DOCUMENTS

| 4,128,006 | * | 12/1978 | Grabow | 73/724 |
| 5,159,525 | * | 10/1992 | Tate | 361/283 |
| 6,070,469 | * | 6/2000 | Taniguchi et al. | 73/720 |

* cited by examiner

Primary Examiner—Benjamin R. Fuller
Assistant Examiner—Abdullahi Aw-Musse
(74) Attorney, Agent, or Firm—Flynn, Thiel, Boutell & Tanis, P.C.

(57) ABSTRACT

A pressure sensor (1) having a first terminal (35), the first terminal (35) including a horizontal portion (61) and a vertical portion (62) at an intermediate portion thereof and being elastically deformable. A portion of the first terminal (35) being inserted and soldered to a circuit substrate (33) has a collar portion (63) being abutted around a through-hole (51) of the circuit substrate (33). The first terminal (35) is fixed at a state being pressed to the circuit substrate (33) by the collar portion (63) and being slightly compressed between a base member (32). When the circuit substrate (33) and the base member (32) are spaced apart by circumambient heat, the first terminal (35) can follow by the compressed margin. When the first terminal (35) itself is thermally expanded, the first terminal (35) can follow by an elastic deformation of the horizontal portion (61) and the vertical portion (62). Accordingly, stress caused to the soldered portion by a thermal deformation and the like can be relaxed so that the pressure sensor (1) can be applied to a wider temperature range.

23 Claims, 18 Drawing Sheets

F I G. 3
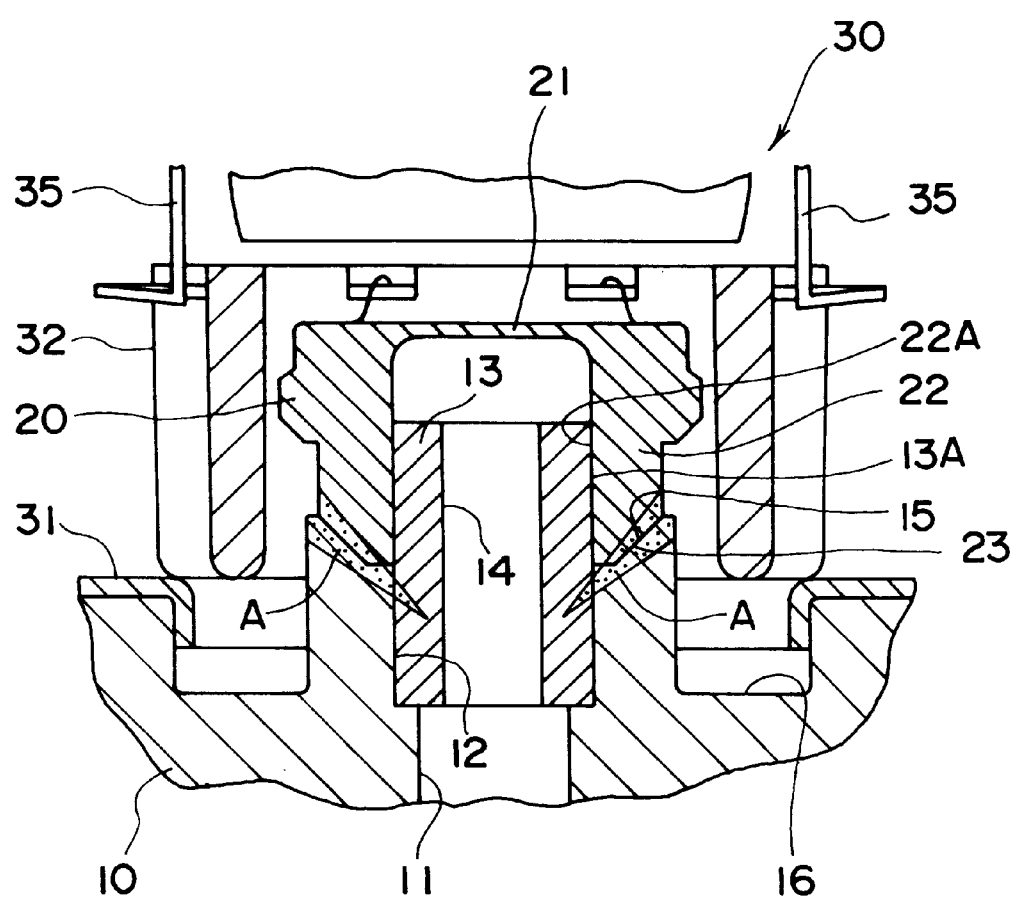

PRESSURE SENSOR

BACKGROUND OF THE INVENTION

1. Field of the Invention

The present invention relates to a pressure sensor. More specifically, it relates to a pressure sensor for converting a fluid pressure into an electronic signal to be outputted to an outside.

2. Description of the Related Art

[Outline of Pressure Sensor]

A pressure sensor that detects a difference between detected pressure and atmospheric pressure and converts into an electric signal is used for measuring a fluid pressure.

An example of the pressure sensor is shown in FIG. 24. In the FIG. 24, the pressure sensor 1A has a fitting 10 to be bolted and fixed to an attachment portion, a pressure-detecting module 20 to be attached to a weld 10A of the fitting 10 by beam-welding etc. and an output device 30 to be electrically connected to the pressure-detecting module 20. The fluid pressure is introduced into a pressure port 11 of the fitting 10 and is converted into a strain of a diaphragm 21 forming the pressure-detecting module 20. The strain is detected by a strain gauge (not shown) on the diaphragm 21 and the electric signal in accordance with a resistance value of the strain gauge is outputted by the output device 30.

The output device 30 has a base member 32 disposed around the pressure-detecting module 20, a circuit substrate (not shown) disposed above the base member 32, electric circuit components 50 such as an IC, resistor and capacitor to be installed on the circuit substrate for processing a signal from the pressure-detecting module 20 and an output connector (not shown) for taking out an output signal from the electric circuit components 50.

The pressure-detecting module 20 and the circuit substrate of the output device 30 is covered by a metal case 31 for electromagnetic shielding. A resin-made covering member (not shown) is provided outside the case 31 for the purpose of blocking dust etc. and forming an exterior of the pressure sensor.

[Deterioration of Soldered Portion]

The pressure-detecting module 20, circuit substrate and output connector of the output device are interconnected directly with respective connecting terminals or through cables. They are connected by inserting an end of the terminal or the cable to a through-hole of the circuit substrate and an output terminal and soldering the surroundings.

In some cases, the circuit substrate is composed of a plurality of plates spaced apart at a predetermined distance. In this case, terminals connecting the respective circuits are used. The terminals between the circuit substrates are generally used in plural, and are usually soldered to the opening of the circuit substrate with an end being inserted thereto while the other end is fixed to the other circuit substrate by soldering and the like.

However, when the pressure sensor is attached to a position where ambient temperature gets extremely high, such as a space adjacent to an engine room of an automobile etc., each component is thermally expanded due to the heat. Especially, if the terminal connecting respective member is thermally expanded, stress is concentrated to the soldered part having less strength, thereby deteriorating the end of the soldered terminal.

[Connection of the Pressure-detecting module and the Circuit Substrate]

The aforesaid pressure-detecting module 20 and the circuit substrate is connected as mentioned below. The circuit substrate has a circular configuration with an opening at the center thereof and the pressure-detecting module 20 is positioned in the opening of the circuit substrate so that the diaphragm 21 and the circuit substrate are approximately coplanar, where the strain gauge on the diaphragm 21 and a pad on the circuit substrate is electrically connected by wire-bonding and the like.

However, according to the aforesaid connection structure, the electric circuit components 50 such as IC, capacitor and resistor can not be installed to the opening of the circuit substrate and the pad for bonding. Accordingly, it is necessary to make the circuit substrate larger correspondingly to the area of the opening to secure sufficient installing area. Additionally, a diameter of the entire pressure sensor body get larger, so that a box wrench for attaching the pressure sensor can not be used in a certain circumambient configuration and a space of the attachment portion, thereby making attachment process difficult.

On the other hand, some of the pressure sensors as shown in Japanese Utility Model Application No. Hei-6-2189, for instance, has a space between the pressure-detecting module 20 and the circuit substrate and an L-shaped terminal projecting from the circuit substrate to the pressure-detecting module 20 to be electrically connected to the strain gauge by wire-bonding. Since the pressure-detecting module 20 and the circuit substrate are alienated and the circuit substrate has no opening, the electric circuit components can be installed all over both surface areas of the circuit substrate, thereby lessening the diameter of the circuit substrate. Accordingly, the diameter of the pressure sensor itself can be decreased to be adjusted to a narrower space.

However, though an end of the L-shaped terminal of the above connection structure is fixed to the circuit substrate, the other end, i.e. wiring side of the wire-bonding, is positioned between the circuit substrate and the pressure-detecting module 20 hanging in midair. So, in an ordinary bonding where an ultrasonic vibration is applied to a wire such as a gold wiring, the wired portion of the terminal can also be vibrated to deteriorate a bonding strength between the terminal and the wire.

[Electromagnetic Shield by a Metal Case]

The case 31 is a electromagnetic shielding member provided as a body independent to the covering member forming the exterior of the pressure sensor 1A, the case 31 being made of metal to protect securely the electric circuit components 50 from electromagnetic interference.

The covering member may be made of metal as an alternative way for protecting the electric circuit components 50. However, since the covering member is relatively a large member in the pressure sensor 1A, the weight reduction of the entire pressure sensor can be made difficult. Furthermore, the covering member has to be a die-casting molding or, alternatively, troublesome machine process is necessary for producing complicated configuration. Therefore, the cost becomes expensive.

Further alternatively, an electromagnetic shielding layer may be provided inside a resin-made covering member by coating a conductive paint. However, though weight of the pressure sensor 1A can be reduced in this structure, coating the conductive paint can be still expensive and reliability of a conductive portion to the fitting can be lowered by an abrasion of the electromagnetic layer.

Accordingly, the metal case 31 provided independently to the covering member allows the covering member to be made of resin to overcome above disadvantages, so that an anti-noise property of the pressure sensor 1A can be improved, weight can be reduced, production cost can be lowered and reliability can be enhanced.

[Problem in Locating the Case]

The case 31 of the pressure sensor shown in FIG. 24 is merely disposed over the fitting 10 with the pressure-detecting module 20 being inserted in the opening provided at a bottom. Accordingly, the position of the case 31 is likely to be displaced relatively to the fitting 10, and a locating work in welding the case 31 to the fitting 10 can be troublesome.

[Sealing by Resin-made Cover]

The covering member is made of resin in view of weight reduction and processing facilitation. The covering member and the fitting are interconnected by crimping the fitting and sealability thereof is improved by putting an O-ring etc. between the covering member and the fitting.

However, when the fitting is made of metal and the covering member is made of resin, the covering member may be separated from the crimped part of the fitting according to a shrinking degree, especially toward inside, of the covering member and the sealability is lost, since a thermal expansion coefficient is distinctively different between the metal and the resin.

An urethane resin, epoxy resin etc. is sometimes filled inside the covering member to restrain the shrinkage of the covering member. However, the filling process and solidification of the resin can take long time, so that productivity can be impaired.

SUMMARY OF THE INVENTION

[Preventing Deterioration on a Soldered Portion]

The principal object of the present invention is to prevent deterioration caused on a soldered portion of a pressure sensor, thus enabling to be used under a wide temperature range.

The pressure sensor according to the present invention has a fitting having a pressure port, a pressure-detecting module attached to an end of the pressure port and an output device electrically connected to the pressure-detecting module to output an electric signal in accordance with the pressure introduced from the pressure port. The output device has a circuit substrate spaced apart from the pressure-detecting module, a base member disposed around the pressure-detecting module and fixed to the fitting and a terminal having first end fixed to the base member and second end connected to the circuit substrate. The present invention is characterized in that the terminal has an elastically deformable portion at an intermediate part of the first end and the second end.

The elastically deformable portion is preferably supported by either one of the first end and the second end in a cantilever fashion.

The elastically deformable portion may be bent in an approximately crank-shape between the first end and the second end.

According to the above structure, the pressure sensor is assembled so that the respective members are connected by the terminal with the elastically deformable portion being deformed elastically at a predetermined amount. Accordingly, when the circumambient temperature is fluctuated, the expansion and contraction by a thermal expansion can be absorbed by the elastically deformable portion, thereby canceling a stress caused on the soldered portion of the end. Therefore, the deterioration of the soldered part can be prevented to attain the aforesaid object of the present invention.

The terminal is preferably soldered while at least either one of the first end and the second end being inserted to an opening of an object to be connected, and preferably has a collar portion abutted to an adjacent portion of an opening around the inserted end.

Accordingly, the locating in soldering can be facilitated and a stress is less likely to be caused to the soldered part even when a great thermal expansion is caused in spite of absorption by the elastically deformable portion, since the collar portion transmits a load to connected objects such as the base member and the circuit substrate, thereby making it difficult for the stress being caused on the soldered portion.

[Connection between Pressure Detecting Module and Circuit Substrate]

Another object of the present invention is to provide a pressure sensor in which bonding strength by wire-bonding between a terminal and a wire for connecting a pressure detecting module and a circuit substrate can be secured even when a diameter of the pressure sensor is reduced.

For the object, the first end preferably has a wiring portion for wire-bonding the pressure-detecting module.

In the above-described pressure sensor, since the end of the terminal on which the wiring portion for wire-bonding is fixed by the base member, the terminal is less likely to be vibrated even when an ultrasonic vibration is applied during bonding. Accordingly, the wire-bonding can be conducted in a good condition so that sufficient bonding strength between the terminal and the wire can be secured.

Further, since the pressure-detecting module and the circuit substrate are spaced apart, the opening employed in conventional pressure sensor is unnecessary to be provided to the circuit substrate. Accordingly, the diameter of the circuit substrate can be reduced to minimize the diameter of the pressure sensor itself.

The wiring portion is preferably buried to the base member with the wiring portion being exposed.

Accordingly, since the base member and the terminal are fixed satisfactorily, the influence to the terminal by the ultrasonic vibration can be further decreased.

The base member is preferably made of resin, and the terminal is preferably insert-molded to the base member.

Accordingly, the terminal having the terminals buried thereto can be easily and inexpensively manufactured, and can be handled easily due to being molded integrally.

[Electromagnetic Shielding by a Metal Case]

Still another object of the present invention is to attain a good dust-blocking property and electromagnetically shielding property with a simple structure in the above-described structure.

The pressure sensor according to the present invention preferably has a metal case attached to a metal fitting to cover the pressure-detecting module and a resin-made covering member attached to the fitting to cover the case.

An electric circuit component electrically connected to the pressure-detecting module is preferably installed on the circuit substrate, and the case is preferably attached to the fitting to cover the electric circuit component.

The electric circuit component installed on the circuit substrate and the pressure-detecting module are preferably electrically connected through a terminal provided to the resin-made base member inside the case.

Accordingly, an exterior of the pressure sensor according to the present invention can be made by resin-made cover to secure dust-blocking property and the pressure-detecting module and the surroundings thereof can be securely shielded electromagnetically by the metal case.

[Electromagnetic Shielding using Circuit Substrate]

Further object of the present invention is to further improve the electromagnetically shielding property and to reduce the size of the device by using the circuit substrate also as a part of an electromagnetic shielding structure.

The metal case preferably has an opening for taking out an output signal and the opening is preferably covered by the circuit substrate.

The circuit substrate preferably has a conductive layer covering approximately entire surface of the opening and the conductive layer is preferably an electromagnetically shielding layer electrically conducted to the case.

Approximately entire upper surface or back surface of the circuit substrate may be used as the electromagnetically shielding layer. Alternatively, any one layer of a laminated substrate may also be used.

The opening may be covered by a combination of a plurality of the electromagnetic shielding layer. In other words, one conductive layer may cover a half of the opening and other conductive layer may cover the rest of the opening.

In the above, the electric circuit component is preferably installed on a surface of the circuit substrate facing inside of the case. The electric component may be connected to the outside by providing a through-hole to the circuit substrate to penetrate the electromagnetically shielding layer insulatedly.

Accordingly, since the circuit substrate is used as a part of the electromagnetically shielding structure covering the electric circuit component and the like as well as the case, the circuit substrate is not necessarily surrounded completely by the circuit substrate, so that the size of the case which mainly works as the electromagnetic shielding structure can be reduced, thereby allowing weight and size reduction of the pressure sensor.

[Sealing Reinforcement by Case]

Still further object of the present invention is to obtain easily a sufficient sealability in using a covering member attached by crimping.

The pressure sensor according the present invention preferably has a metal fitting having a thin crimping portion, a case attached to the fitting to cover the pressure-detecting module, a resin-made covering member covering the case and attached to the fitting by crimping the crimping portion, and is preferably characterized in that outside of the case is opposed adjacently to inside of the covering member at a position corresponding to the crimping portion.

Accordingly, since the metal case is disposed adjacently to and opposingly to the inside of the covering member, the covering member inclined to contract toward inside can be held by the case so that the contraction can be restricted. Therefore, a good sealability can be obtained by securing the crimping of the covering member and the fitting. And the contraction of the covering member can be prevented only by attaching the case to the fitting, so that extra work such as preparing and filling a liquid resin and solidifying thereof can be omitted, thereby improving workability.

The case preferably has a projection protruded in an attaching direction of the base member, and the base member preferably has an inserting portion for the projection to be inserted.

In attaching the base member to the case, the projection of the case can be inserted and fitted to the inserting portion of the base member and the fitted portion can also be bonded by, for instance, an adhesive. Accordingly, the bonding strength can be increased as compared to mere bonding, the location of the base member relative to the case can be precisely defined, and the base member is unlikely to get out of position after being located.

[Locating of the Case]

Still further object of the present invention is to locate easily the electromagnetic shielding case relatively to the fitting.

The pressure sensor according to the present invention preferably has a pressure-detecting module welded to an end of the pressure port provided to the fitting and an electromagnetically shielding case attached to the fitting to cover the electric circuit components electrically connected to the pressure-detecting module, and the fitting preferably has an engaging portion for engaging the case to determine the location thereof.

Since the engaging portion is provided to the fitting, the case can be located easily by engaging the case to the engaging portion, thereby accomplishing the aforesaid object.

The engaging portion preferably has an approximately concave cross section depressed relative to an attachment surface of the case, and the case preferably has a projecting portion to be engaged to the engaging portion.

Since the engaging portion is provided as a depression, a tip end of the welding machine or the like for welding the other member and the pressure-detecting module is not interfered with the engaging portion, thereby improving production efficiency.

The fitting is preferably bolted to an attachment portion of an object, and the engaging portion is preferably a circular groove provided around a weld portion for the pressure-detecting module to be welded.

Accordingly, stress caused by bolting the fitting is concentrated to a deeper portion, that is, a portion away from the welded portion of the circular groove, the stress applied to the pressure-detecting module, for instance, to the diaphragm can be decreased to avoid the strain of the diaphragm and to prevent an output shifting.

The deeper portion of the groove preferably has a bored portion along radial direction of the pressure port.

Since the deeper portion of the groove is bored, the stress is concentrated to the bored portion. Accordingly, the stress is not likely to reach the pressure-detecting module and inappropriate output shifting can be prevented, even when sufficient depth of the groove can not be obtained.

[Other Features]

The case preferably has a holder for holding the circuit substrate.

Accordingly, a displacement of the circuit substrate caused by heat can be restrained, so that a stress fatigue of the bonding portion of the circuit substrate and the terminal can be decreased.

The covering member is preferably used also for a connector. And the connector preferably has a connector body attached to the fitting and an output terminal penetrating the connector body from an inside thereof to the outside.

Accordingly, the terminal is connected to the outside of the case, thereby the size of the structure can be reduced. Furthermore, a sealability on the portion connected to the outside can be improved by integrated with the covering member.

The connector body attached to the fitting may have a receiving member attached to the inside of the connector body and the receiving member is preferably supported by the case at a back side thereof relative to an attaching direction to the connector body.

Accordingly, when the connector is connected to a counterpart (a female connector to a male connector, or vice versa, for example), the receiving member is supported and held by the case in spite of a force applied to the receiving member by an insert resistance. Therefore, the receiving member can be securely prevented from being detached from the connector body.

BRIEF DESCRIPTION OF THE DRAWINGS

FIG. 3 is a sectional view showing a welded portion of a pressure-detecting module of the aforesaid embodiment;

DETAILED DESCRIPTION OF THE PREFERRED EMBODIMENT(S)

A preferred embodiment of the present invention will be described below with reference to the drawings.

Figure 1:
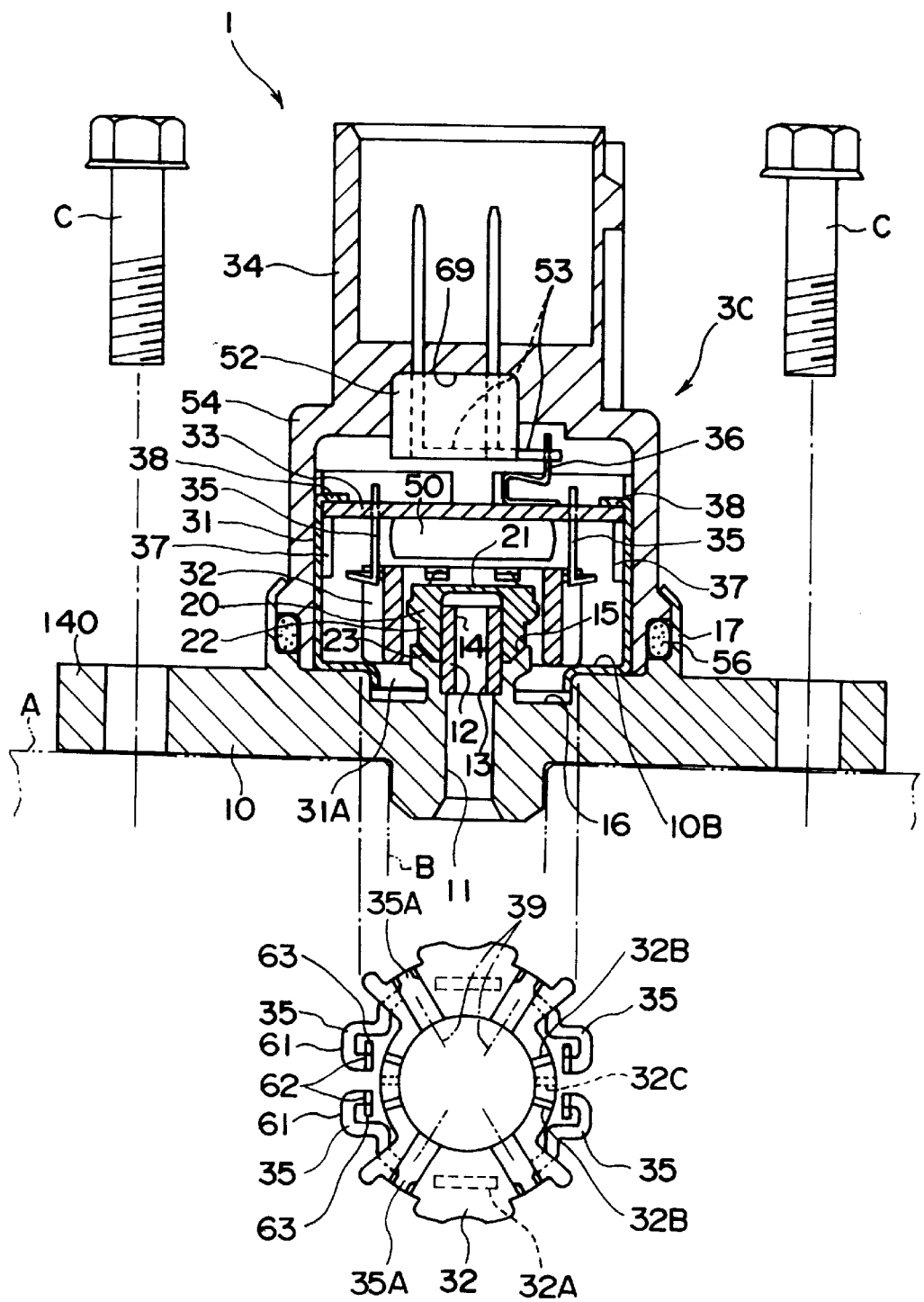
FIG. 1 is a vertical cross sectional view showing a preferred embodiment according to the present invention.
Figure 2:
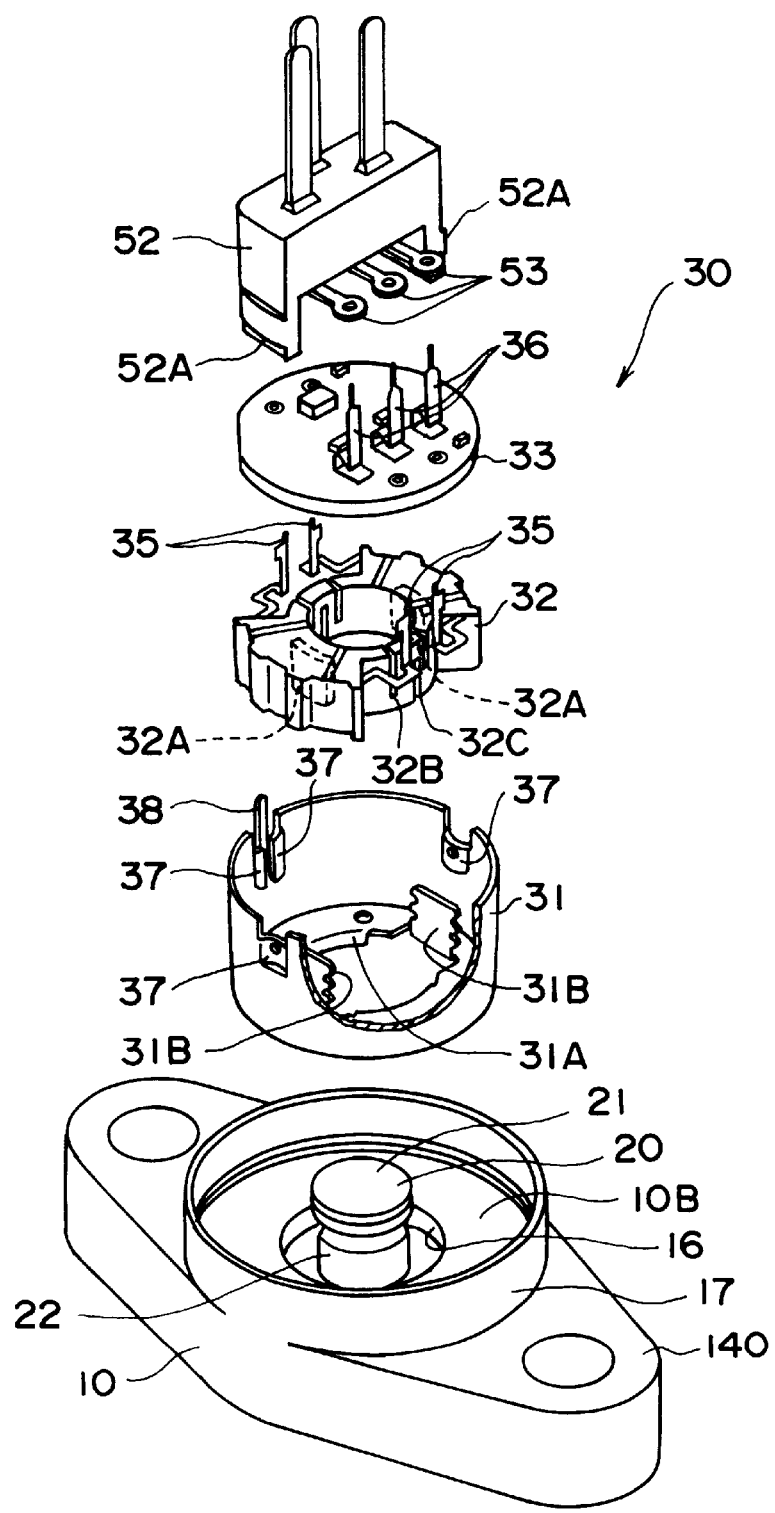
FIG. 2 is an exploded perspective view showing the aforesaid embodiment.

FIG. 1 is a cross sectional view showing a pressure sensor 1 of the present embodiment and FIG. 2 is an exploded perspective view thereof.

The pressure sensor 1 has a fitting 10 as a base, a pressure-detecting module 20 beam-welded to the fitting 10 and an output means 30 for outputting an electric signal to the outside in accordance with a detected pressure. The pressure sensor 1 is for installing in an automobile, especially for detecting hydraulic pressure of a brake.

[Fitting 10]

The fitting 10 is made of metal and is bolted to an attachment portion A shown in a double-dotted line in FIG. 1 by a bolt C which is inserted to an insert hole B of attachment portion A and is inserted through a flange portion 140 integrally provided with the fitting 10.

The fitting 10 has a pressure port 11 penetrating in a vertical direction in FIG. 1 (up and down: Hereinafter, the wordings such as "up" and "down", "above" and "below" and the like indicating dispositions are used merely for representing directions in respective drawings, and is not meant to indicate practically attached position of respective components).

[Pressure port 11 and Pipe 13]

The pressure port 11 has a diameter of the same as or more than 2.5 mm, which is easily processed by a twist drill. The upper end of the pressure port 11 is a fitted portion 12 drilled in a larger diameter, to which a pipe 13 is fitted with a part thereof being protruded from the pressure port 11.

The pipe 13 is a metal component obtained by drawing processing, of which penetrating hole 14 has a diameter substantially smaller than the diameter of the pressure port 11 and is difficult to be processed by twist drills.

The pipe 13 controls an inner volume of the pressure port 11 to be smaller. The pipe 13 also works as a backing member in welding the pressure-detecting module 20.

[Upper Part of the Pressure port 11]

As shown in FIG. 3, a tapered surface 15 for welding the pressure-detecting module 20 is provided on upper circumference of the pressure port 11.

The tapered surface 15 has a conic surface projecting toward the pressure port 11 (downward in FIG. 3) to be narrower. A generatrix of the tapered surface 15 is inclined relative to a radial direction of the pressure port 11 at 30 to 60 degrees, preferably 35 to 55 degrees, more preferably 40 to 50 degrees.

A locating groove 16 lower than the tapered surface is provided outside the tapered surface 15. The locating groove 16 is used for attaching a case 31 (described below) and is extending successively on a plane in circle. The bottom of the locating groove 16 (i.e. the farther side in depth direction) is bored in the radial direction of the pressure port 11 toward inside.

[Pressure-detecting module 20]

As shown in FIG. 3, the pressure module 20 is a strain gauge type module having a metal diaphragm 21 having thereon with a strain gauge through an insulating layer such as silicon dioxide.

The diaphragm 21 of the pressure-detecting module 20 is formed integrally with a cylindrical portion 22 provided below. An inner side 22A of the cylindrical portion 22 is abutted to an outer side 13A of the pipe 13, so that the entire pressure-detecting module 20 is guided by the outer side 13A as a guiding surface to be positioned above the fitting 10. Accordingly, the inside of the cylindrical portion 22 and the pressure port 11 is intercommunicated and a hydraulic pressure is applied to a pressure sensing surface of the diaphragm 21.

Another tapered surface 23 opposing and abutted to the tapered surface 15 of the fitting 10 is provided to the lower end of the cylindrical portion 22 to connect the pressure-detecting module 20 to the fitting. The tapered surfaces 15 and 23 are beam-welded in a direction along a slanting direction thereof with both of surfaces being abutted.

A welded portion A by the beam-welding reaches the pipe 13. The pipe 13 also works as a backing member in welding being positioned correspondingly to the welded part. Incidentally, when the slanting angle of the tapered surfaces 15 and 23 is less than the lower limit (30 degrees), welding strength is not expected to improve since sufficient welded area cannot be obtained and the welding itself may become impossible on account of the interference between the welding machine and a rise portion 17 provided around the fitting 10. On the contrary, when the slanting angle is larger than the upper limit (60 degrees), the welding machine can be interfered with a bulging portion formed on the upper part of the cylindrical portion 22 and adjustment of welding machine and a tool can be made difficult, thereby impairing productivity.

[Output Device 30]

As shown in FIG. 1 and 2, the output device 30 has an electromagnetic shielding cylindrical metal case 31 for protecting the electric circuit components 50 from noise, a resin-made base member 32 disposed at the bottom of the case 31 to surround the pressure-detecting module 20, a circuit substrate 33 disposed above the base member 32 and a resin-made connector 34 which works as a covering member covering all the components 31, 32 and 33. The base member 32 and the circuit substrate 33 are connected by first terminal 35, and the circuit substrate 33 and the connector 34 are connected by second terminal 36.

In the output device 30, the pressure applied to the diaphragm 21 of the pressure-detecting module 20 is converted into an electric resistance value by the strain gauge on the diaphragm 21 and a signal processor of the circuit substrate 33 connected to the strain gauge through the first terminal 35. The resistance value is converted into a predetermined electric signal by the signal processor to be outputted from an output terminal 53 of the connector 34 through the second terminal 36.

[Case 31]

The case 31 is an electromagnetic shielding member for protecting the electric circuit components 50 installed on both sides of the circuit substrate 33, such as an IC, a capacitor and a resistor.

The case 31 is fixed by projection-welding a bottom side of the case 31 and attaching surface 10B of the fitting 10.

A projecting portion 31A is provided on a periphery of an opening of the bottom of the case 31 and the projecting portion 31A is bent downward by draw process or the like. The projecting portion 31A is fitted and engaged to an upper periphery of the locating groove 16, thereby locating the case 31 coaxially to the fitting 10.

A projection 31B bent upward is provided on other part of the bottom opening periphery of the case 31, which is used for attaching the base member 32.

A supporting portion 37 which is processed by press or cut-and-raise (forming a cut and bending the cut portion) of a part of a side thereof, onto which a circuit substrate 33 is mounted. And a contact portion 38 is provided on a part of upper end of the case 31. A ground wiring of the circuit substrate 33 and the case 31 (the fitting 10 in the end) is electrically connected through the contact portion 38 so that the electric circuit components 50 such as an IC installed on a bottom side of the circuit substrate 33 covered by the case 31 can be securely electromagnetically shielded. And the circuit substrate 33 is securely pushed to the case 31 from upside by the contact portion 38. The supporting portion 37 and the contact portion 38 forms a holder of the present invention.

[Base Member 32]

The base member 32 has an inserting portion 32A extending from a bottom side thereof, to which the projection 31B of the case 31 can be inserted. In fitting the base member 32 to the case 31, an adhesive is coated to a bottom side of the base member 32 to bond the bottom (peripheral portion of the opening) of the case 31, and the projection 31B is fitted to the inserting portion 32A with an adhesive being filled therein. Accordingly, a bonding strength of the base member 32 relative to the case 31 is improved. Incidentally, the base ember 32 and the case 31 are not restricted to be bonded by an adhesive but can be joined by other measures such as an ultrasonic-welding and the like, or by a combination of a plurality of ways such as adhesive and an ultrasonic-welding.

A first terminal 35 is attached to the base member 32. An end of the first terminal 35 exposed on upper surface of the base member 32 is a wiring portion 35A. The wiring portion 35A and the strain gauge of the pressure-detecting module 20 is electrically connected by wire-bonding a gold wiring 39.

Figure 4:
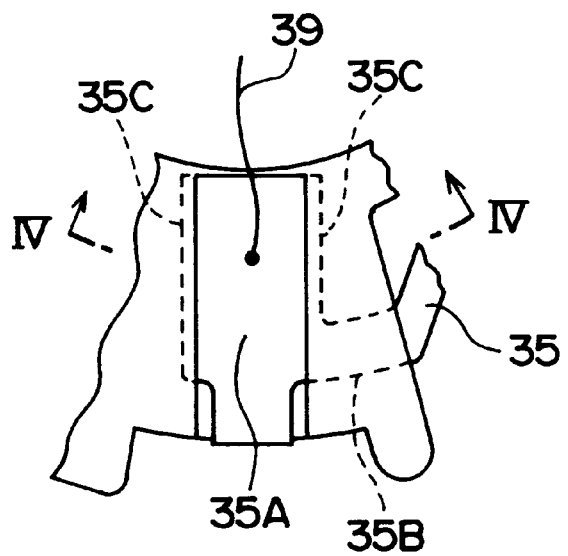
FIG. 4 is a top plan view showing a part of first terminal of the aforesaid embodiment.
Figure 5:
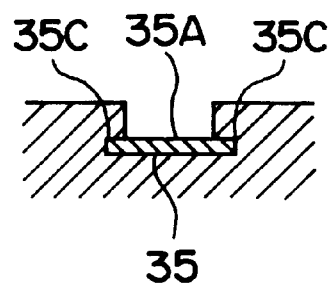
FIG. 5 is a sectional view showing a part of the first terminal of the aforesaid embodiment.

As shown in FIGS. 4 and 5, the first terminal 35 is buried and fixed by insert-molding a fixing portion 35B. Especially, since the peripheral portion 35C of longer edge of the wiring portion 35A is successively buried to the base member 32, a vibration of the first terminal 35 caused in bonding conducted by applying a ultrasonic vibration to the gold wiring 39 can be securely prevented.

[Rigidity Relaxation of the Base Member 32]

The base member 32 has a thicker portion provided with the inserting portion 32A and a thinner portion connecting therebetween. The thinner portion has a slit 32C cut from downside, on both side of which a slit 32B is cut from upside. The slit 32B and 32C can be integrally formed in molding the base member 32 (See FIG. 1, FIG. 2 and FIG. 6).

The rigidity of the thinner portion can be relaxed by the slit 32B and 32C to relieve deformation as a whole even when the base member 32 causes local thermal expansion by soldering, environmental temperature or the like. Accordingly, the movement of the terminal 35 caused by heat can be decreased so that a trouble such as a fatigue fracture of the bonding of the terminal 35 can be avoided.

The number, location and minute configuration of the slit 32B and 32C for relaxing rigidity can be changed, or the slit 32B and 32C can be omitted, in accordance with the necessary rigidity relaxation property.

[Circuit Substrate 33]

A signal processor is formed on the circuit substrate 33 by installing the electric circuit components 50 such as IC, resistors and capacitors. A through-hole 51 is provided on an input of the circuit, to which the upper end of the first terminal 35 is inserted and soldered (see FIG. 6) and a lower ends of the plurality of the second terminal 36 are soldered to an output side terminal (see FIG. 1 and 2).

[Electromagnetic Shield by the Circuit Substrate 33]

The circuit substrate 33 as well as the case 31 forms an electromagnetic shielding structure for electromagnetically shielding the pressure-detecting module 20 and electric circuit components 50 accommodated therein from the outside. In other words, the case 31 is a metallic cylinder for covering a side of a space in which the pressure-detecting module 20 and the electric circuit components 50 are accommodated. The bottom opening of the case 31 is covered by the metallic fitting 10. An opening provided on upper side of the case 31 for taking out the output signal is shut by the circuit substrate 33. The circuit substrate 33 has an electromagnetic shielding layer electrically conducted to the case 31, which electrically shields the upper opening of the case 31.

Figure 7:
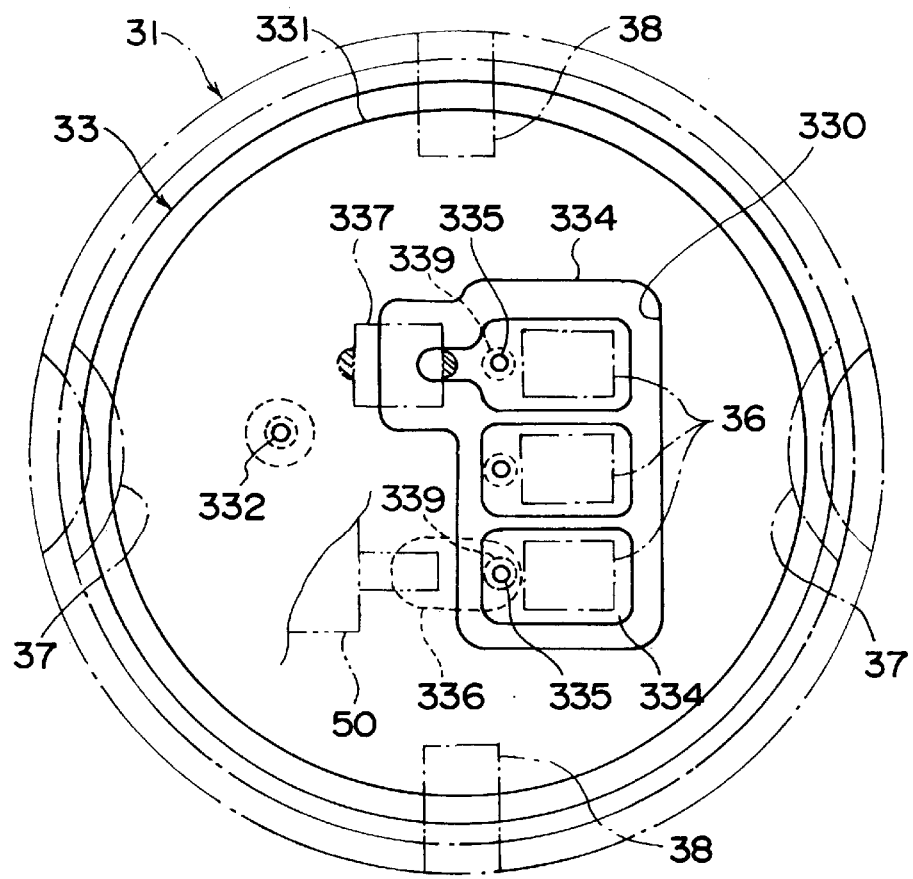
FIG. 7 is a top plan view schematically showing a circuit substrate of the aforesaid embodiment.
Figure 8:
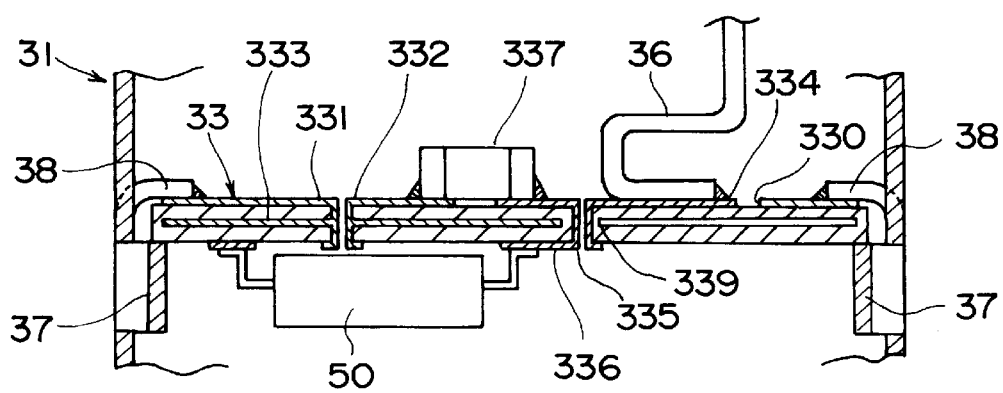
FIG. 8 is a vertical cross sectional view schematically showing the circuit substrate of the aforesaid embodiment.

As shown in FIGS. 7 and 8, the circuit substrate 33 is a laminated substrate having a plurality of conductive layer, including an upper layer on the connector 34 side surface, a middle layer inserted between a substrate material and a lower layer on the pressure-detecting module 20 surface. The second terminal 36 are connected to a surface of the upper layer, and the electric circuit components 50 is installed on a surface of the lower layer. Though not specifically shown, the surface of the lower layer has a conductive layer for forming necessary circuits, to a part of which the first terminal 35 is connected.

The upper layer is a sheet conductive layer 331 extending successively in approximately entire area. The contact portion 38 of the case 31 as the holder is abutted to the conductive layer 331, which is ground-connected to the case 31. The conductive layer 331 is not formed on a predetermined width of the peripheral portion of the circuit substrate 33 and an inside of a central terminal area 330.

The inside of the terminal area 330 has separated conductive layers 334 for connecting the lower end of the second terminal 36, respective conductive layers 334 being conducted to also separated conductive layer 336 provided on the lower layer through the through-hall 335. Respective terminal of the electric circuit components 50 is connected to the respective conductive layer 336, thereby taking out signals from each terminal of the electric circuit components 50. A capacitor 337 for filtering noise is connected between one of the conductive layers 334 (minus side of the circuit) and the conductive layer 331 (ground). Incidentally, a noise-filtering device can be set according to a practical use. For instance, the capacitor 337 is most preferably connected to a plus-wiring of a power source, signal output wiring and a common wiring of the circuit, and preferably connected to the power source and the signal output wiring.

Approximately the entire area of the middle layer is a successive conductive layer 333. The conductive layer 333 and the conductive layer 331 are connected by the through-hall 332. The conductive layer 333 is not provided on a predetermined width of the periphery of the circuit substrate and a quite small portion around the through-hall 335 for taking out signal.

According to the above-described structure, the conductive layer 331 on the upper side of the circuit substrate 33 and the conductive layer 333 of the middle layer connected thereto through the through-hall 332 are conducted to the case 31 to form electromagnetic shielding layer. The electromagnetic shielding layer covers almost the entire surface of the circuit substrate 33. Especially, the conductive layer 331 of the upper layer and the conductive layer 333 of the middle layer doubly conduct electromagnetic shielding and the conductive layer 333 of the middle layer covers approximately entire area except for extremely small area. Accordingly, the opening of the upper side of the case 31 can be sufficiently electromagnetic-shielded by the circuit substrate 33.

Figure 9:
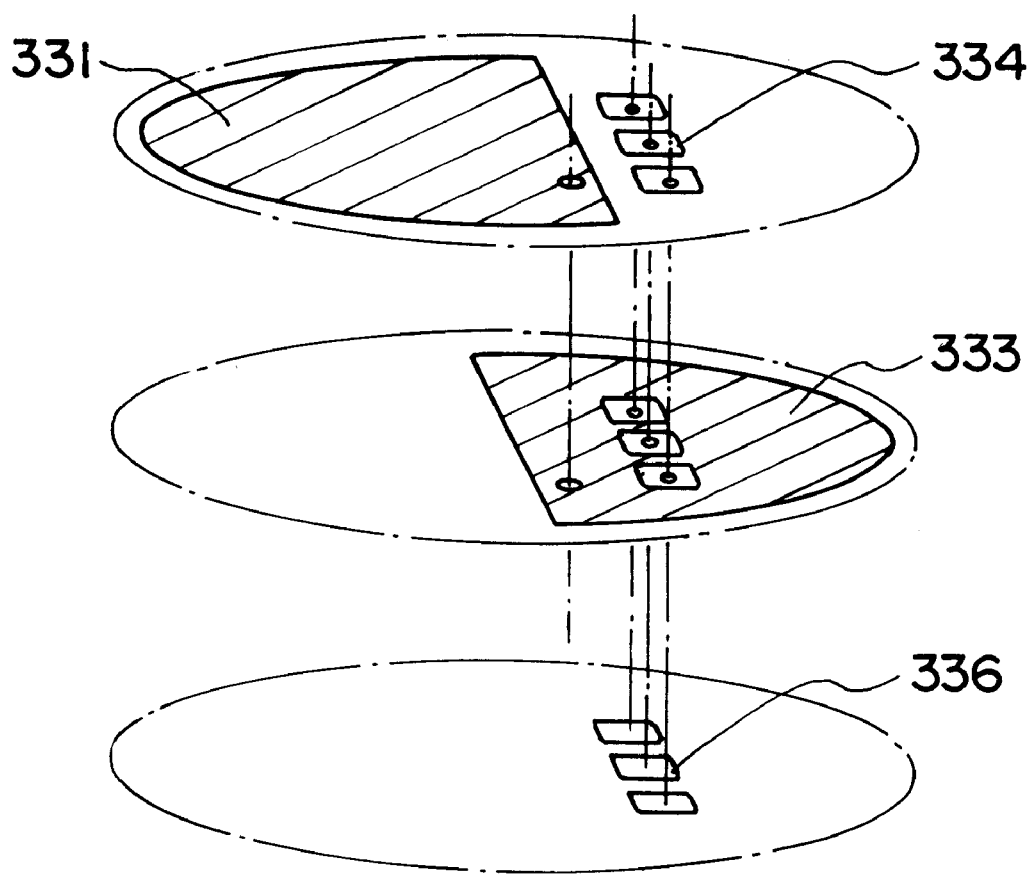
FIG. 9 is an exploded perspective view schematically showing the circuit substrate of the aforesaid embodiment.

Though the conductive layer 331 of the upper layer and the conductive layer 333 of the middle layer are approximately entirely overlapped with each other in the above-described structure, these layers may be configured to supplement with each other. For example, the conductive layer 331 of the upper layer and the conductive layer 333 of the middle layer may be configured to be approximately semicircular as shown in FIG. 9 to supplement with each other. Accordingly, the terminal area 330 can be enlarged and other circuit structure may be formed on the middle layer.

Figure 10:
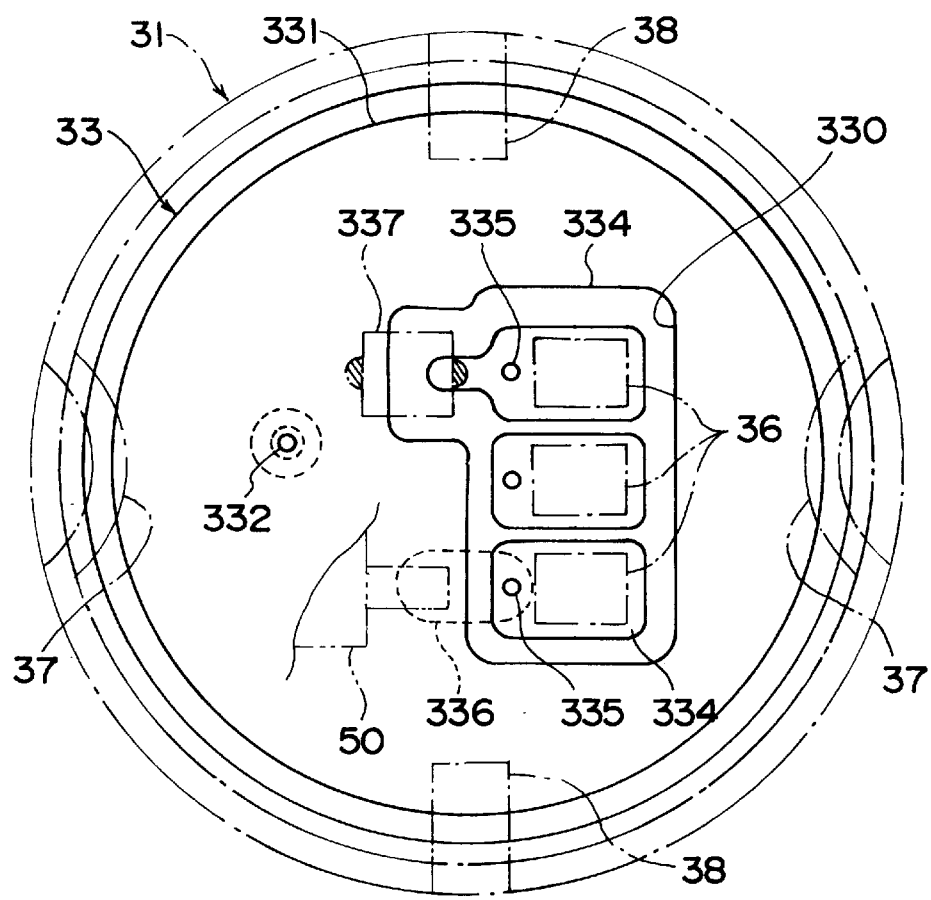
FIG. 10 is a top plan view corresponding to FIG. 7 showing another construction of the circuit substrate of the aforesaid embodiment.
Figure 11:
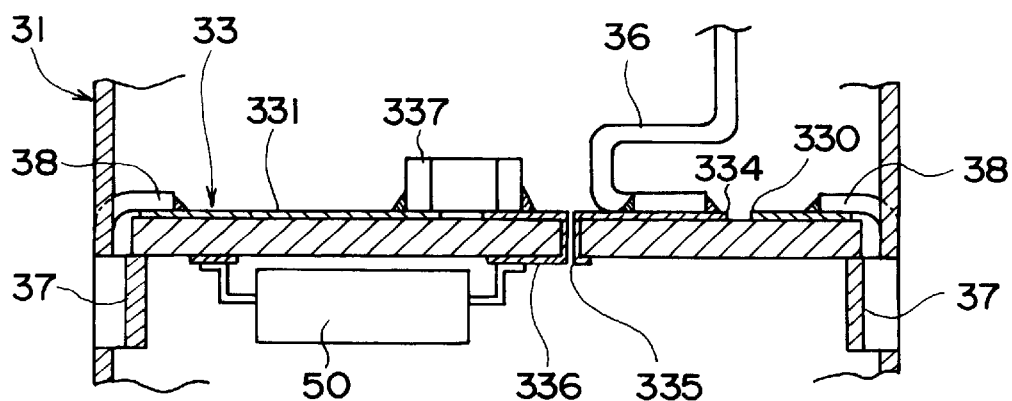
FIG. 11 is a vertical cross sectional view corresponding to FIG. 8 showing another construction of the circuit substrate of the aforesaid embodiment.

The circuit substrate 33 for electromagnetic shield is not limited to the laminated substrate. For instance, the middle layer of the FIG. 7 and FIG. 8 is omitted in a substrate shown in FIGS. 10 and 11. Other component is identical and is shown in the identical signs. According to the structure, similar electromagnetic shielding effect can be obtained. However, since no middle layer is provided and double electromagnetic shielding layer cannot be formed, the effect is inferior. Furthermore, since the terminal area 330 opened relatively wider is not covered by the middle layer, the electromagnetic shielding effect is also inferior in this respect.

Figure 12:
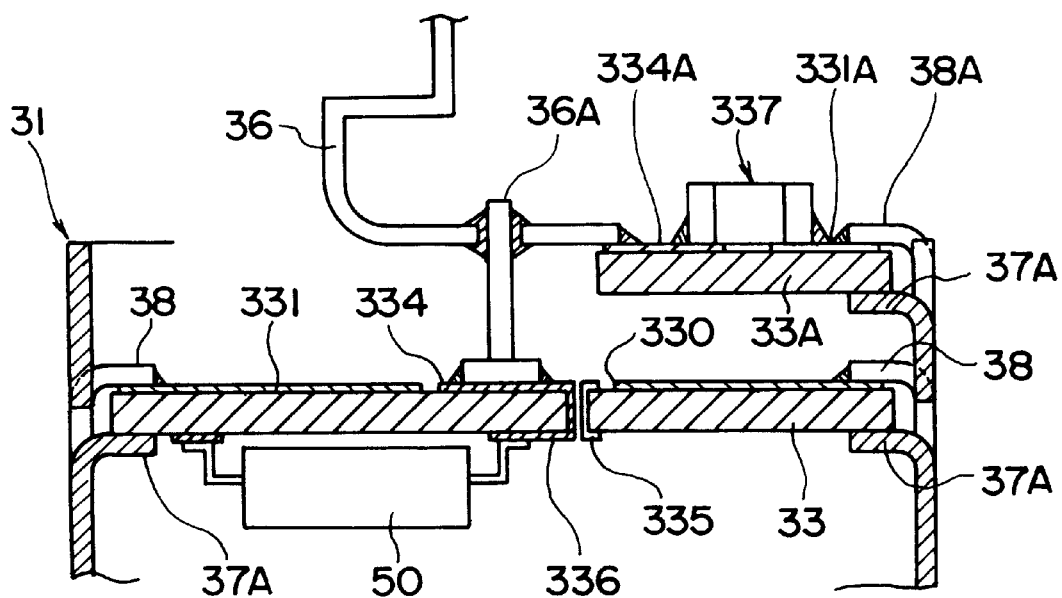
FIG. 12 is a vertical cross sectional view corresponding to FIG. 8 showing another construction of the circuit substrate of the aforesaid embodiment.

A structure shown in FIG. 12 can be adopted for narrowing the terminal area 330.

In this structure, the circuit substrate 33 and the second terminal 36 is 10 connected through an intermediate terminal 36A. And an auxiliary substrate 33A independent on the circuit substrate 33 is provided to have thereon a capacitor 337 for noise-filtering. The auxiliary substrate 33A is held in the case 31 by a holder (the supporting portion 37A and the contact portion 38A) similar to the circuit substrate 33. On a surface of the auxiliary substrate 33A, a conductive layer 331A to be abutted to the contact portion 38A and a conductive layer 334A separated thereto are formed. The capacitor 337 is put over the conductive layers 331A and 334A. The conductive layer 334A has connected thereto an extension of a lower end of one of the second terminals 36 (minus-side of the circuit).

According to the above structure, the terminal area 330 can be minimized in the ordinary circuit substrate 33. However, the structure can be complicated since the auxiliary substrate 33A is necessary.

[Connector 34]

Figure 13:
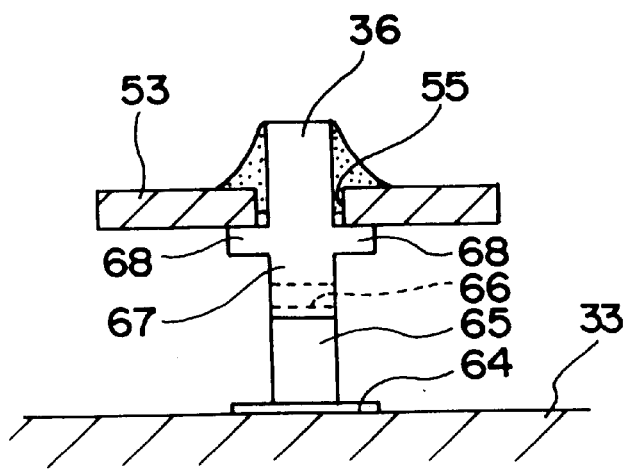
FIG. 13 is a cross sectional view showing second terminal of the aforesaid embodiment.

A plurality of the output terminals 53 insert-molded to the resin-made receiving member 52 are provided to the connector 34. As shown in FIG. 13, an upper end of the second terminal 36 is inserted and soldered to an insert hole 55 provided at an lower end of the output terminals 53.

The output terminal 53 is fixed from an inside of the connector body 54 together with the receiving member 52 and only a pointed end of the output terminal 53 is penetrated to the outside to be exposed.

A receiving portion 52A to be abutted to and supported by the upper end of the case 31 is provided to a lower portion of the receiving member 52, thereby preventing the receiving member 52 from detaching from the insert portion 69 of the connector body 54.

The lower end of the connector body 54 is located in a rise portion 17 as a thin crimping portion of the fitting 10 through an O-ring 56. The inside of the lower end of the connector body 54 is closely opposed to the outside of the case 31 so that a pointed end of the rise portion 17 is crimped to allow the connector body fixed to the fitting 10.

The inside of the connector body 54 and the outside of the case 31 is preferably abutted as shown in FIG. 1. However, a predetermined space may be provided therebetween as long as shrinkage toward inside of the connector 34 can be avoided so that sealability can be maintained.

[First Terminal 35]

Figure 6:
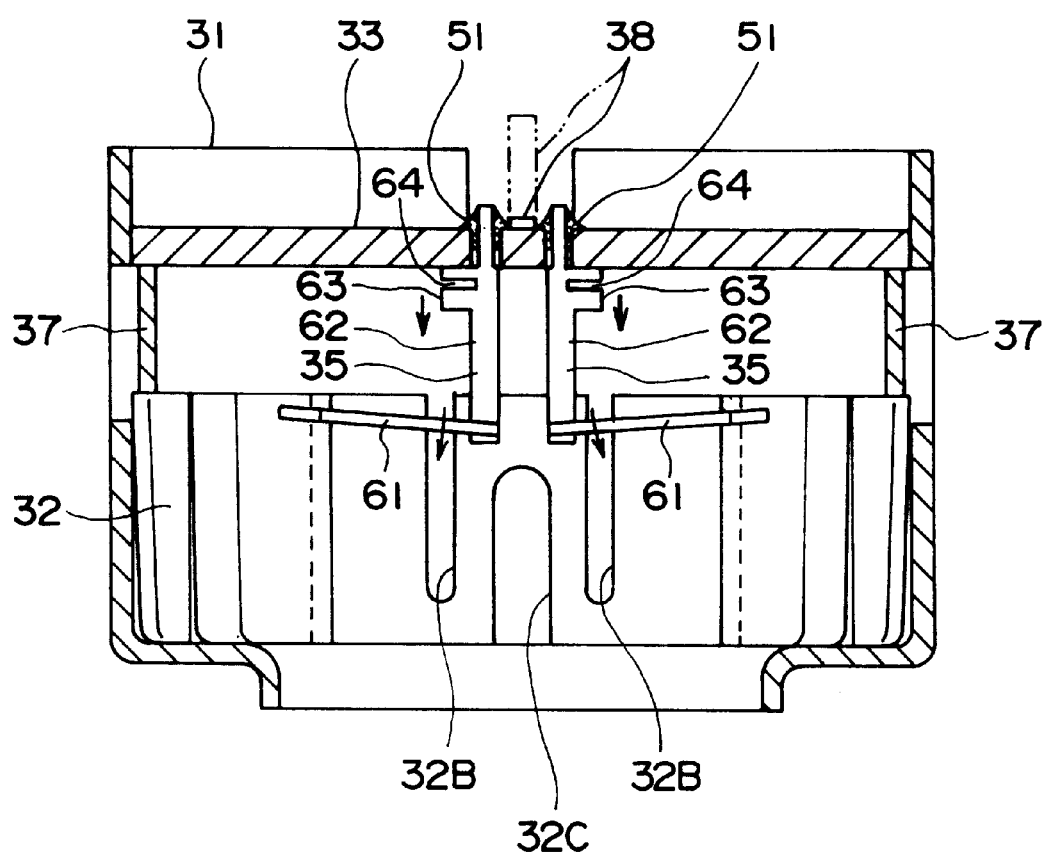
FIG. 6 is a sectional view showing a area surrounding a base member of the aforesaid embodiment.

FIG. 6 shows an enlarged view of the first terminal 35 (IC or the like provided on the circuit substrate 33 is not shown).

The first terminal 35 is insert-molded to the base member 32 as described above. Additionally to the above description, the first terminal 35 has a horizontal portion 61 protruded from a side of the base member 32 and a vertical portion 62 bent vertically from a pointed end of the horizontal portion 61. The horizontal portion 61 works as a plate spring supported in a cantilever fashion to allow the first terminal 35 to be elastically deformed between the base member 32 and the circuit substrate 33. A collar portion 63 abutted to lower side of the circuit substrate is provided to the vertical portion 62 at a position adjacent to the tip end thereof and slightly retreated to the base (horizontal portion 61 side).

An upper end of the collar portion 63 of the first terminal 35 is located above an upper end of the supporting portion 37 of the case 31 before the circuit substrate 33 is disposed. Accordingly, when the circuit substrate 33 is mounted on the supporting portion 37, the collar portion 63 is pushed downward by the lower side of the circuit substrate 33 to deform the first terminal 35 elastically. In this state, the first terminal 35 is soldered to the through-hole 51.

[Second Terminal 36]

FIG. 13 shows an enlarged view of the second terminal 36.

The second terminal 36 has a connecting portion 64 soldered onto the circuit substrate 33, first vertical portion 65 bent upward from an end of the connecting portion 64, a horizontal portion 66 bent from an end of the first vertical portion 65 and a second vertical portion 67 bent further upward from the horizontal portion 66 so that the second terminal 36 is formed in a crank-shape, in which the horizontal portion 66 can be deformed elastically by working as a plate spring. A pair of collar portions 68 abutted to the lower side of the output terminal 53 is provided at a position adjacent to the pointed end of the second vertical portion 67 and slightly retreated to a base (the horizontal portion 66 side).

The second terminal 36 is deformed elastically by inserting the output terminal 53 to the insert portion 69 of the connector body 54 together with the receiving member 52 as shown in FIG. 1 and fixing the connector body 54 to the fitting 10 after soldering the output terminal 53 while being abutted to the collar portion 68. In other words, the second terminal 36 is first deformed elastically when the entire connector 34 is attached to the fitting 10.

[Heat Capacity Control of Collar Portion 63]

As shown in FIG. 6, a slit 64 for controlling heat capacity is provided to the collar portion 63 of the first terminal 35. The slit 64 is cut to the collar portion 63 with a narrower area retained to the side adjacent to the circuit substrate 33. The width of the slit 64 is preferably narrower as possible within a range in which press die cutting of the first terminal 35 is possible. For instance, the width of the slit 64 can be approximately 0.5 mm, width retained to the substrate 33 can be approximately 0.3 mm and approximately 0.4 mm for the other side.

Following effect can be obtained by forming the slit 64. When the portion inserted to the through-hole 51 is soldered and the inserted tip end is heated, the heat is transmitted to a part other than the collar portion 63 if there is no slit 64. Consequently, the heat capacity of the heated portion of the tip end is increased, so that a larger heat quantity is necessary for desired soldering temperature. Also, the heat is transmitted to a base of the first terminal 35 and heat influence to the surroundings cannot be ignored. On the other hand, forming the slit 64 allows a thermal transmission channel (from the top to the bottom in the figure) to be narrower by the slit 64 restraining the thermal transmission below the collar portion 63. Accordingly, substantive thermal capacity of the soldering tip end can be decreased to enable heating to necessary temperature in a short time, and to prevent influence of unnecessary heat toward surroundings.

The slit 64 may be formed to the collar portion 68 of the second terminal 36.

Incidentally, the slit 64 is not restricted to be cut from one side but may be formed by cutting from both sides or may be formed in zigzag by shifting a pair of cuttings alternately. The size or the like of the cut may be set in accordance with necessary properties. The slit 64 may be omitted when the effect is not required.

[Holder of the Second Terminal]

The second terminal 36 is provided in a line on the circuit substrate 33 and is integrated by a terminal holder 360 for improving handling property thereof.

Figure 14:
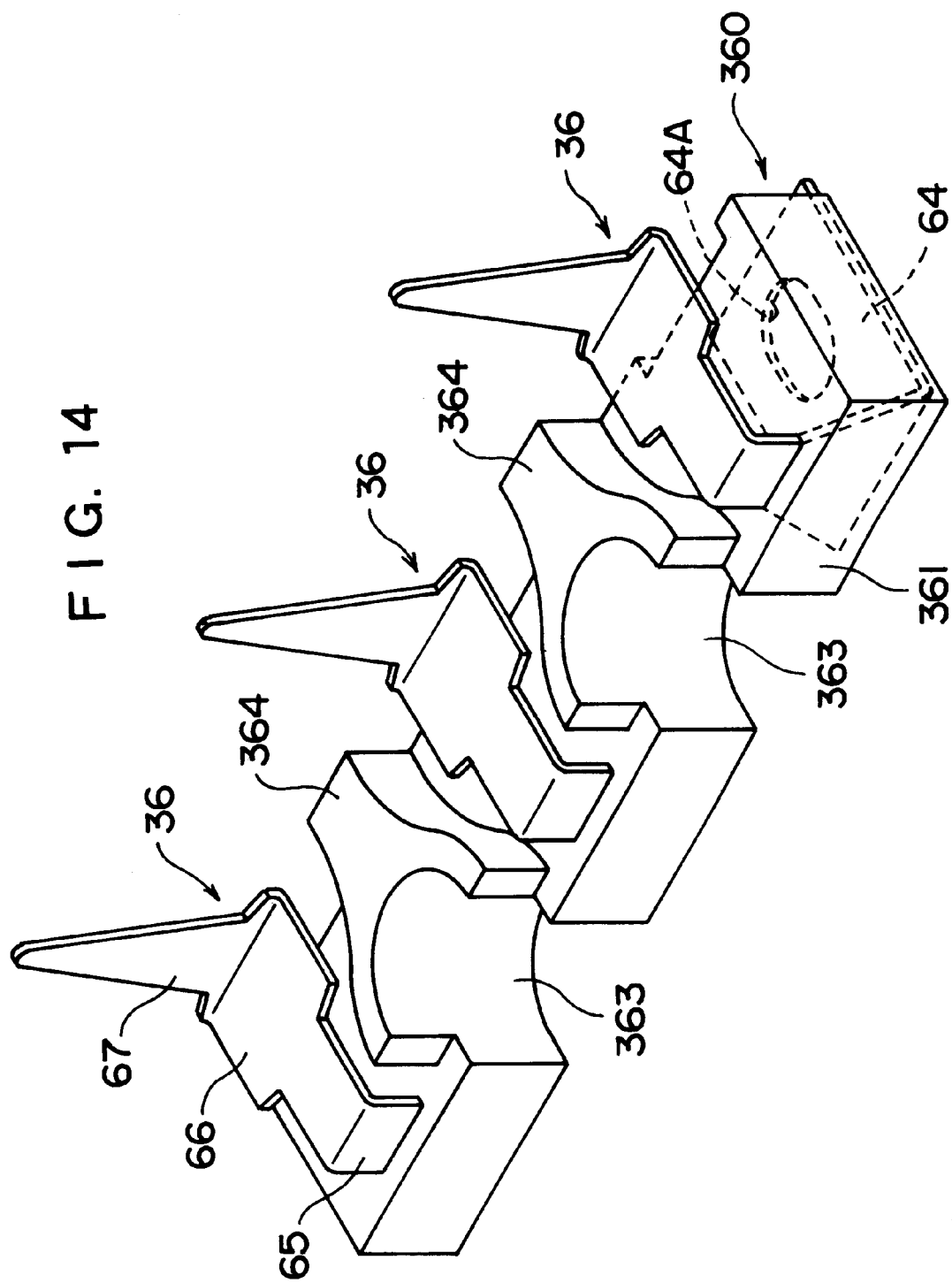
FIG. 14 is a perspective view showing a terminal holder of the aforesaid embodiment.
Figure 15:
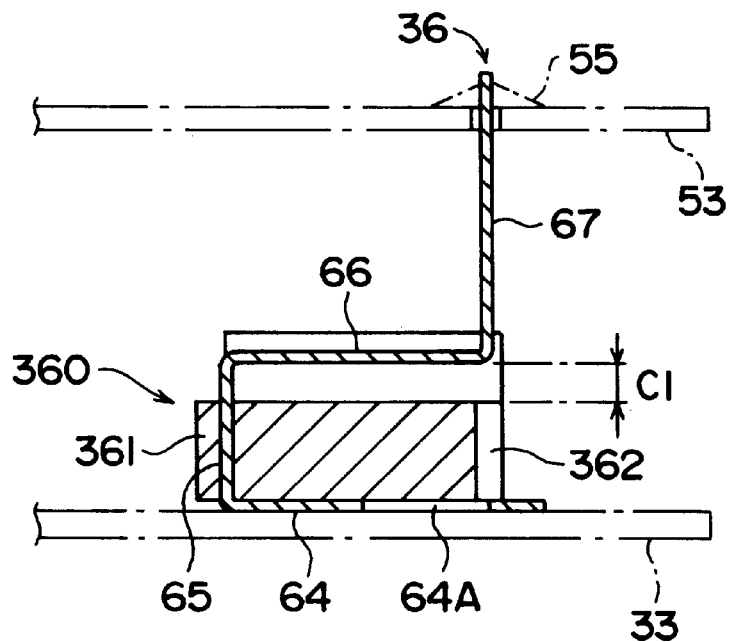
FIG. 15 is a cross sectional view showing the terminal holder of the aforesaid embodiment.
Figure 16:
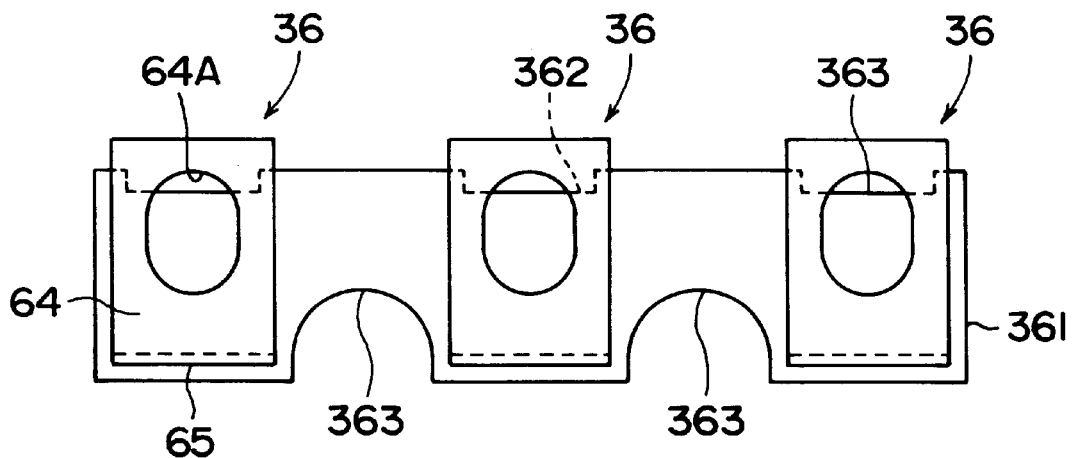
FIG. 16 is a perspective view showing another construction of the terminal holder of the aforesaid embodiment.

As shown in FIGS. 14 and 15, the terminal holder 360 is a resin-made block member, which is insert-molded so that the lower portion of the second terminal 36 is buried therein. Epoxy resin, polyimide resin, modified polyamide resin and the like having insulation property is suitable for the resin material.

More specifically, the base portion 361 of the terminal holder 360 is shaped to be square block, to which the first vertical portion 65 of the second terminal 36 is buried. The contact portion 64 is extended along the bottom side of the base portion 361 and the horizontal portion 66 is extended along the upper side of the base portion 361. A predetermined space C1 is provided between the upper side of the base portion 361 and the horizontal portion 66 not to impair the elastic deformation of the second terminal 36.

A solder groove 362 is formed on a side of the base portion 361 at a position corresponding to a tip end of the connecting portion 64 so that the solder is accommodated in soldering the connecting portion 64 to the circuit substrate 33. A hole 64A is provided to the connecting portion 64 for enhancing soldering to the substrate 33.

A semicircular cut 363 is formed on a side opposite to the solder groove 362 between respective second terminals 36. A partition 364 is integrally formed on an upper side of the base 361. The partition 364 has a C-shaped part surrounding the cut 363. The opposite end is extended to a side on which the solder grove 362 is formed.

Accordingly, since a plurality of the second terminals 36 is integrally attached to the single terminal holder 360, a trouble for locating respective terminals etc. can be avoided.

[Assembly]

In the above-described embodiment, the pressure-detecting module 20 is first beam-welded to the fitting 10.

Next, the case 31 is disposed to the fitting 10 from upside, the location of the case 31 is determined by engaging the projecting portion 31A of the case 31 to the locating groove 16 and the case 31 is projection-welded to the fitting 10.

Next, the adhesive is coated to or filled in the lower side of the base member 32 and the inserting portion 32A, the inserting portion 32A and the projection 31B are fitted to bond the base member to the case 31 and the wire-bonding of the wiring portion 35A of the first terminal 35 and the strain gauge of the pressure-detecting module 20 is electrically conducted.

Then, the circuit substrate 33 is disposed from upside so that the first terminal 35 is inserted to the through-hole 51, the circuit substrate 33 is fixed by bending the contact portion 38 of the case 31 to deform elastically the first terminal 35 and the through-hole 51 and the first terminal 35 are soldered.

Subsequently, the output terminal 53 integrated with the receiving member 52 is soldered to the second terminal 36, the receiving member 52 is mounted on the upper end of the case 31 to be supported and the receiving member 52 is inserted to the insert portion 69 of the connector body 54 and is fixed by an adhesive or the like. The receiving member 52 may be fixed to the insert portion 69 by a latch portion.

Finally, the connector body 54 (connector 34) is fixed to the fitting 10 to deform the second terminal 36 elastically in a predetermined configuration, and the fitting 10 is crimped in this state to fix the connector 34, thereby completing assembly of the pressure sensor 1.

The pressure sensor 1 is attached to the attachment portion A by inserting the bolt C into the flange portion 140 and fastening the bolt C.

[Effect]

According to the present embodiment, following effect can be attained.

[Base Member and Bonding]

In the pressure sensor 1, since the wiring portion 35A of the first terminal 35 is fixed to the base member 32 by the fixing portion 35B, the vibration of the first terminal 35 can be prevented even when an ultrasonic vibration is applied to the gold wiring 39 during wire-bonding. Accordingly, the first terminal 35 and the gold wiring 39 can be wired at a good condition, thereby securing a bonding strength therebetween.

Since the first terminal 35 is fixed to the base member 32 with the fixing portion 35B being buried to the base member 32, the fixing condition can be maintained better than merely fixing the fixing portion 35B with an adhesive or the like, thereby further decreasing the influence of the ultrasonic vibration to the first terminal 35.

Since the first terminal 35 is fixed not only by the buried fixing portion 35B but also by the wiring portion 35A being buried to the peripheral portion 35C, the first terminal 35 is further unlikely to be influenced by the ultrasonic vibration, and turn-over of the wiring portion 35A in handling the base member 32 can be prevented.

Since the terminal of the conventional pressure sensor works as a spring by being hang over, the terminal can be instantaneously deformed elastically to be pushed back when the tip end of the bonding machine contacts the wiring portion of the terminal in bonding, causing snapping of the gold wiring and the like.

However, since the first terminal 35 is fixed to the base member 32 and the back side of the wiring portion 35A is received by the base member 32 according to the present embodiment, the first terminal 35 is not elastically deformed even when the bonding machine contacts the wiring portion 35A, thereby preventing the snapping of the gold wiring 39 to secure wiring.

Since the first terminal 35 is buried by being insert-molded to the base member 32, the base member 32 buried with the first terminal 35 can be manufactured easily and inexpensively and can be handled easily by being integrally formed.

[Fixing the Base Member]

In attaching the base member 32 to the case 31, the projection 31B of the case 31 is inserted and fitted to the inserting portion 32A of the base member 32. Since the fitted portion 12 is bonded with an adhesive, the bonding strength can be increased as compared to just coating the adhesive on the bottom of the base member 32.

Since the projection 31B of the case 31 is fitted to the inserting portion 32A of the base member 32, the base member 32 can be precisely located to the case 31. Further, the slide of the base member 32 before the adhesive being solidified can be prevented after locating the base member 32.

[Cancellation of Substrate Opening by Base Member]

Since the pressure-detecting module 20 and the circuit substrate 33 is spaced apart by the base member 32, the opening conventionally provided to the circuit substrate can be made unnecessary, thereby allowing to reduce the diameter of the pressure sensor 1 by minimizing the diameter of the circuit substrate 33.

Since the space between the pressure-detecting module 20 and the circuit substrate 33 is defined to enable the electric circuit components 50 being installed on the lower side of the circuit substrate 33, the installing efficiency can be improved enabling to reduce the diameter of the circuit substrate 33, thereby enhancing the reduction in diameter.

[Elastic Deformation of the Terminal]

The first terminal and second terminal 35 and 36 can be elastically deformed between the base member 32 and the circuit substrate 33, and between the circuit substrate 33 and the output terminal 53, respectively.

Accordingly, an opposing force is caused by the circuit substrate 33 or the output terminal 53 to the respective terminals 35 and 36 irrespective of the circumambient temperature so that stresses caused to soldered part by thermal expansion of the respective terminals 35 and 36 can be cancelled to avoid substantive stressed being caused on the soldered part.

Accordingly, the deterioration of the soldered part can be effectively prevented even when the pressure sensor 1 is attached to a high-temperature part such as surroundings of an automobile engine.

Further, since the collar portion 63 and 68 pressed by respective lower side of the circuit substrate 33 and the output terminal 53 are provided to the first and the second terminal 35 and 36, the terminal 35 and 36 can be elastically deformed at a predetermined amount in assembling the pressure sensor 1 and the soldering of the part can be protected.

In other words, even when the first and the second terminal 35 and 36 are further expanded thermally, the abutting portion of the collar portion 63 of the first terminal 35 to the area adjacent to the through-hole 51 of the circuit substrate 33 and the abutting portion of the collar portion 68 of the second terminal 36 to the area adjacent to the insert hole 55 of the output terminal 53 receive a load to decrease the stress caused on the soldered part, which is effective in preventing deterioration.

Since the first and the second terminal 35 and 36 work as plate springs by having an end being supported in a cantilever fashion or by being bent in a crank-shape, a sufficient elastic strength can be given to the respective terminals 35 and 36.

[Electromagnetic Shield]

Since the metal case 31 is attached to the fitting 10 covering the electric circuit components 50, the case 31 can be used as an electromagnetic shielding member so that anti-noise property of the pressure sensor 1 can be improved by protecting the electric circuit components 50 from an electric noise.

Furthermore, since the upper opening of the case 31 is shut by the circuit substrate 33 to shield electromagnetically, no other covering body is necessary to allow size and weight reduction of the body.

[Volume Control of the Pressure port]

The pressure port 11 has a pipe 13 having penetrating hole 14 of smaller diameter than the diameter of the pressure port 11. Accordingly, the volume inside the pressure port 11 can be reduced by the thickness of the pipe 13, thereby improving the responsive property of the pressure sensor 1.

Though the diameter of the penetrating hole 14 is smaller than the diameter of the pressure port 11, it is not processed by a twist drill but is processed simultaneously with a drawing process of the pipe 13. Accordingly, the processing of the penetrating hole 14 can be simplified to facilitate volume control inside the pressure port 11.

The responsive property of the pressure sensor 1 is largely influenced by a dimension accuracy of the penetrating hole. Since the pipe 13 is manufactured by the drawing process, a penetrating hole 14 having highly accurate dimension can be obtained. Accordingly, the quality of the pressure sensor 1 can be stabilized.

[Weld of the Pressure-Detecting Module 20]

Since the fitting 10 and the pressure-detecting module 20 are welded, the bonding strength can be increased. Further, since the weld reaches the pipe 13, the pipe 13 can be welded simultaneously with the welding of the fitting 10 and the pressure-detecting module 20, so that the pipe 13 can be fixed firmly and efficiently.

Since the pipe 13 is disposed correspondingly to the welded part of the fitting 10 and the pressure-detecting module 20, the pipe 13 works as a backing member to prevent over-penetration in welding.

The abutting portion of the fitting 10 and the pressure-detecting module 20 is the tapered surfaces 15 and 23, which are welded in the slanting angle direction thereof. Accordingly, the bonding strength of the pressure-detecting module 20 can be further increased due to the increase in welded area, allowing the use of the pressure sensor 1 at a higher pressure range.

Since the pipe 13 is protruded from an end of the pressure port 11 and the outer surface 13A of the protruded portion is a guiding surface of the pressure-detecting module 20, the pressure-detecting module 20 can be easily mounted by guiding the inner surface 22A of the cylindrical portion 22 of the pressure-detecting module 20 by the outer surface 13A of the pipe 13.

[Seal Reinforcement by the Case]

Since the metal case 31 of the pressure sensor 1 is provided adjacently and opposingly to the inside of the resin-made connector body 54, the connector 34 which is inclined to move away from the crimping portion of the fitting 10 to shrink toward inside can be held by the case 31 to control the shrinkage. Accordingly, the crimping of the connector 34 and the fitting 10 can be securely maintained to obtain good sealability.

Since the shrinkage of the connector 34 can be prevented only by attaching the case 31 to the fitting 10, there is no need for preparing the fluid resin to fill inside the connector 34 and solidifying the resin, thereby improving productivity.

Since the metal case 31 of the pressure sensor 1 is provided inside the connector 34, the shrinkage of the lower end of the connector 34 by a temperature change can be prevented, so that the sealability of the crimping portion of the fitting 10 can be maintained well. Accordingly, the pressure-detecting module 20 can be sufficiently protected from the outside without sealing the space between the pressure-detecting module 20 and the circuit substrate 33, so that a troublesome sealing between the circuit substrate 33 and the case 31 can be omitted and the pressure sensor 1 can be manufactured easily and inexpensively.

[Locating and Fixing the Case]

Since the fitting 10 has a locating groove 16, the location of the case 31 can be determined only by engaging the projecting portion 31A projecting from the bottom of the case 31 to the locating groove 16, thereby easily conducting the locating process.

The locating groove 16 allows decreasing the stress caused on the fitting 10. Especially, the influence of the stress applied to the pressure-detecting module 20 can be decreased to diminish a pressure fluctuation, thereby improving reliability.

Since the case 31 is located by the locating groove 16, there is no need for the attachment surface 10B of the fitting 10 to be provided with a convex portion as an engaging portion. Accordingly, a possible interference with the base member 32 and the tip end of the beam-welding machine can be avoided.

Since the locating groove 16 is provided surrounding the tapered surface 15 as an welded portion of the pressure-detecting module 20, the stress caused in bolting the fitting 10 through the flange portion 140 can be concentrated to the bottom of the locating groove 16, i.e. the portion downward away from the tapered surface 15. Accordingly, the stress can be prevented to reach the diaphragm 21 of the pressure-detecting module 20 to prevent the output shifting.

Since the locating groove 16 is bored at the bottom portion, the stress can be concentrated to the bored portion. Accordingly, even when enough depth of the locating groove 16 can not be secured, the output shifting of the pressure-detecting module 20 can be securely prevented by making it difficult for the stress to reach the welded part, thereby reducing the thickness of the fitting 10.

[Holder etc.]

Since the supporting portion 37 and the contact portion 38 for holding the circuit substrate 33 are provided to the case 31, a displacement of the circuit substrate 33 caused by heat can be reduced. Accordingly, the stress fatigue of the soldered portion between the circuit substrate 33 and the first terminal 35 and between the second terminal 36 and the output terminal 53, respectively, can be decreased to improve reliability.

Since a receiving portion 52A abutting the upper end of the case 31 is provided on the lower side of the receiving member 52, the receiving member 52 can be supported and held by the case 31 when a force is applied to the receiving member 52 by insert resistance in connecting the connector 34 to a counterpart. Accordingly, the receiving member 52 can be securely prevented to detach from the insert portion 69 of the connector body 54.

[Modifications etc.]

The scope of the present invention is not limited to the above-described embodiment but includes other structures in which the objects of the present invention can be attained. Following modifications and the like are also included within the present invention.

[Attachment of the Pressure Sensor]

Though the pressure sensor 1 is bolted to the attachment portion A by inserting the bolt C to the flange portion 140, following attachment structure can also be adopted.

Independent flange member may be used instead of the flange portion 140.

Figure 17:
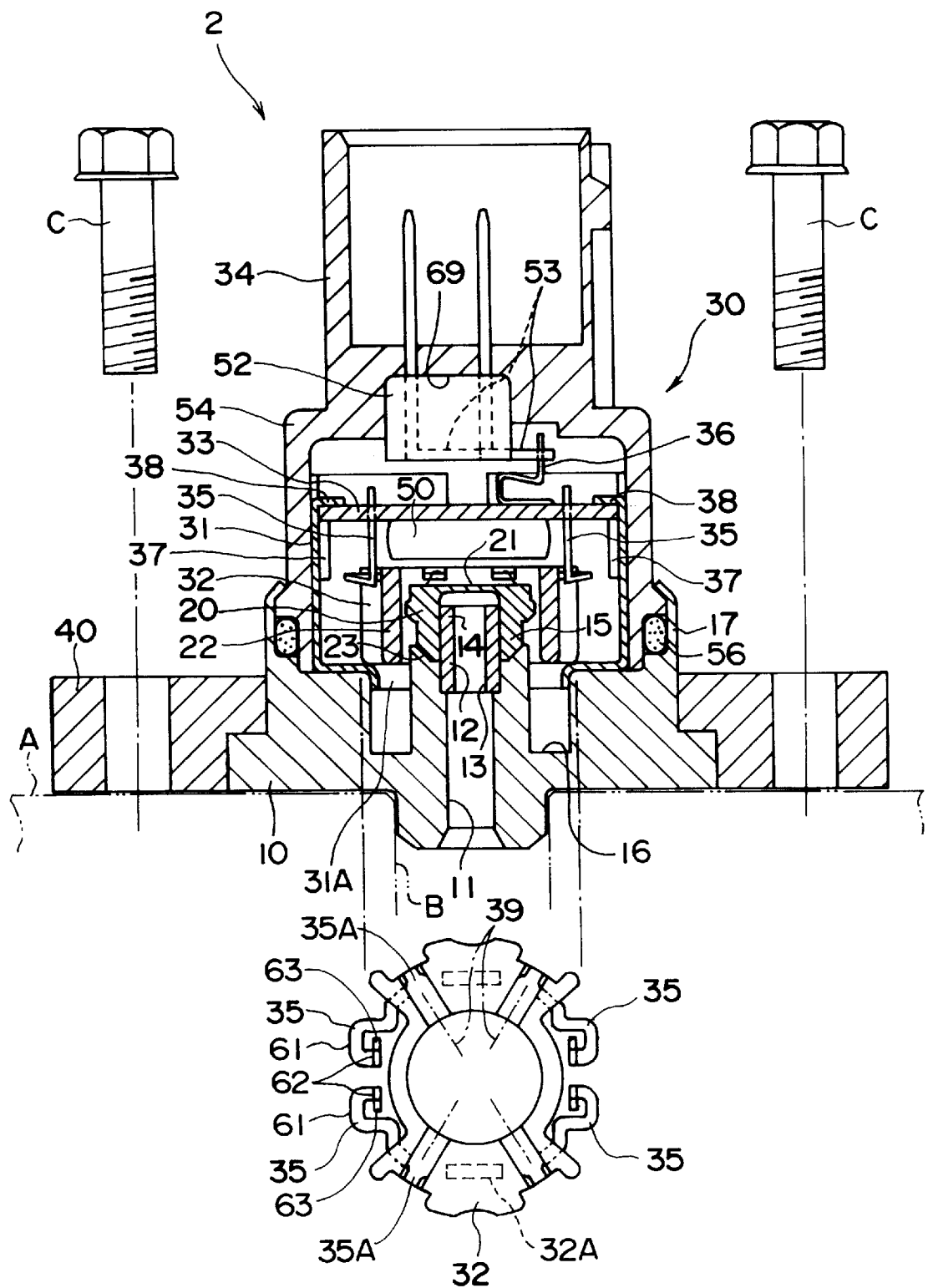
FIG. 17 is a vertical cross sectional view corresponding to FIG. 1 showing another preferred embodiment according to the present invention.

In FIG. 17, the fitting 10 is bolted through an independent and thicker flange 40, a part of the stress caused by bolting can be absorbed by a border of the fitting 10 and the flange 40, thereby decreasing the stress itself caused to the fitting 10.

Figure 18:
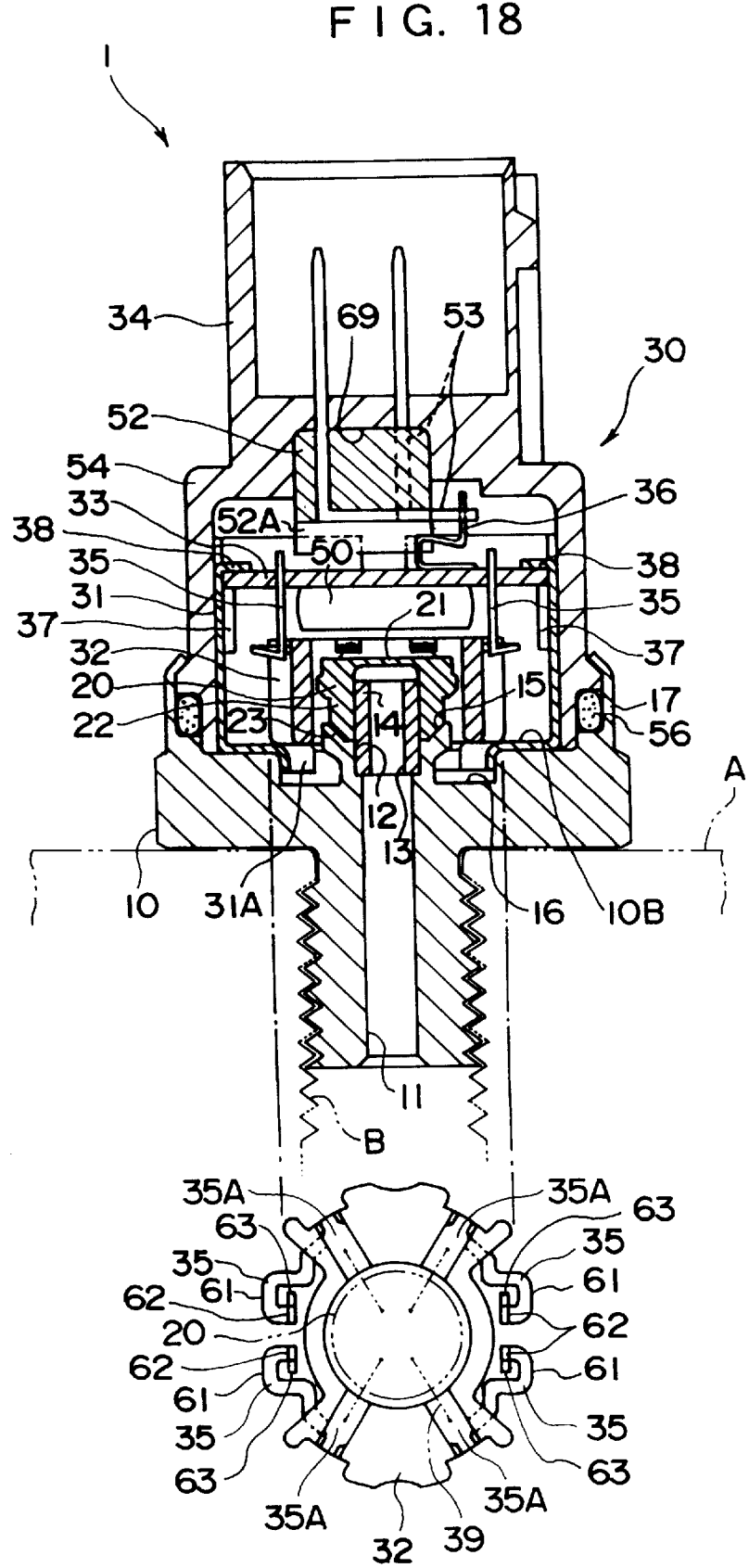
FIG. 18 is another vertical cross sectional view corresponding to FIG. 1 showing another preferred embodiment according to the present invention.
Figure 19:
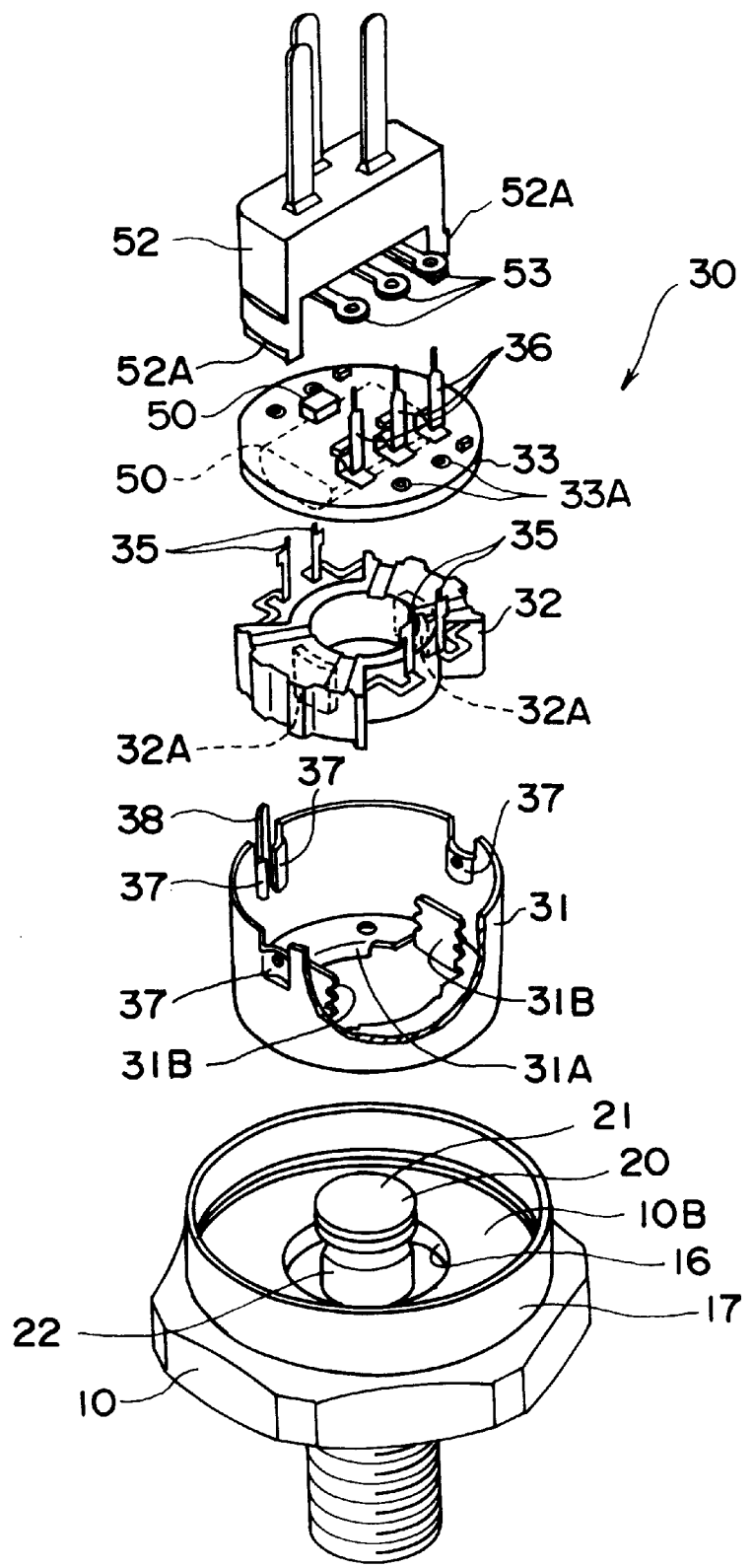
FIG. 19 is an exploded perspective view corresponding to FIG. 2 showing another preferred embodiment according to the present invention.

As shown in FIG. 18 and 19, a female screw may be cut to a inner surface of the insert hole B and a male screw corresponding to the female screw may be cut around the pressure port 11 for the pressure sensor to be rotated and bolted.

The locating groove 16 makes it difficult for the stress caused in bolting to exert influence on the pressure-detecting module 20 in this case too, and the flange and flange portion can be omitted to reduce the size.

[Base Member]

The minute configuration and material of the base member 32 can be selected in accordance with practical use.

The structure for fixing the base member 32 is not limited to the aforementioned embodiment but the projection 31B of the case 31 and the insert portion 32A of the base member 32 fitted to the projection 31B can be omitted. The base member may be fixed only by bonding with an adhesive and the like. However, the projection and the insert portion are preferably provided since the aforesaid effect can be obtained.

The first terminal 35 is buried and fixed to the base member 32 by insert-molding according to the above-described embodiment. However, the first terminal 35 can be fixed to the base member 32 in any manner. For instance, the first terminal 35 may be bonded with an adhesive or an ultrasonic bonding. The first terminal 35 may be press-fitted to a groove or the like provided on the base member 32. However, since extra work such as press-fitting is necessary as compared to the insert-molding, the above-described embodiment is more preferable.

[Terminals]

The first terminal 35 and the second terminal 36 of the above-described embodiment can be deformed elastically by holding an end of the horizontal portion 61 in a cantilever fashion and forming the second terminal 36 in a crank-shape by the horizontal portion 66 and the first and second vertical portion 65 and 67 provided on both sides of the horizontal portion 66. However, the configuration and structure of the terminals according to the present invention are optional and elastic force can be applied by being formed in a coil shape.

Figure 20:
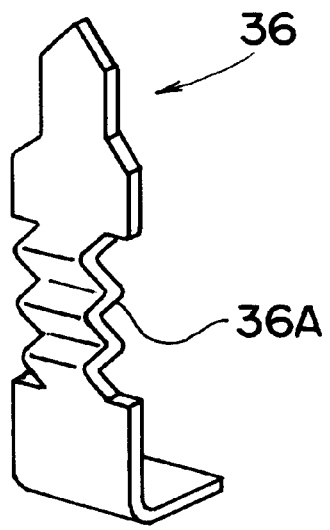
FIG. 20 is a perspective view showing a modification of the second terminal.
Figure 21:
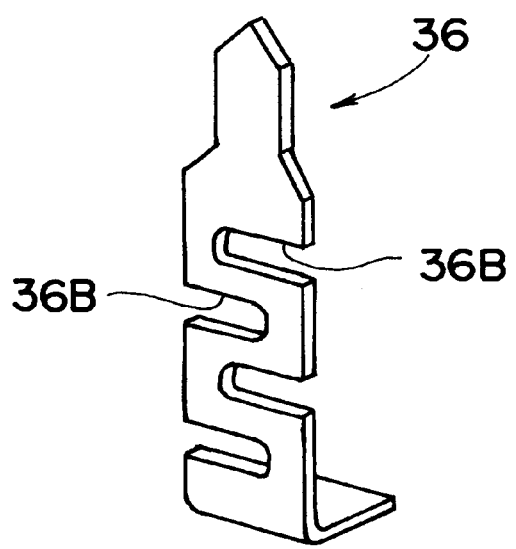
FIG. 21 is another perspective view showing another modification of the second terminal.

For instance, the elastic deformability may be obtained by a structure shown in FIG. 20, in which a corrugated portion 36A is provided or by a structure shown in FIG. 21, in which an alternate cut 36B is provided.

Further, the configuration and structure of the collar portions 63 and 68 according to the present invention is optional and is not limited to the specific configuration and the like. In short, any configuration can be adopted as long as the collar portion is abutted to and pressed by components composing the output device such as the circuit substrate 33 and the output terminal 53.

The collar portions 63 and 68 are provided on one end of the first and second terminal 35 and 36 of the aforementioned embodiment. However, the collar portions may be provided on both sides of the terminals when the both ends of the terminals are inserted and soldered to a through-hole and an insert-hole.

[Electromagnetic Shielding]

The case 31 of the above-described embodiment works as an electromagnetic shielding member. However, any structure can be adopted as long as the case 31 is disposed adjacently and opposingly to the inner surface of the covering member to improve sealability of the crimping portion. The use of the case for electromagnetic shielding by covering the electric circuit components may be determined considering whether the surroundings in which the pressure sensor is used require countermeasures against noise.

[Groove for Locating the Case]

Though the bottom of the locating groove 16 of the above-described embodiment is bored toward center of the pressure port 11, the bottom may be bored away from the center of the pressure port 11 or may be bored in both directions. The bored direction may be determined appropriately in practical use.

As shown in FIG. 17, the locating groove 16 may be formed in a vertical groove of simple square concave cross section. The bottom of the locating groove 16 may be formed of curves. Accordingly, a stress caused inside the locating groove 16, especially to a corner portions, can be dispersed and local concentration can be avoided to prevent a crack from generating in the groove.

The locating groove 16 according to the above-described embodiment is provided as an engaging portion of the fitting 10. However, the engaging portion of the present invention may be a plurality of concave depression independently provided. In this case, a projection corresponding to respective depression may be provided to the case to be engaged to the depressions, thereby facilitating locating the case.

[Engaging portion of the Case]

Figure 22:
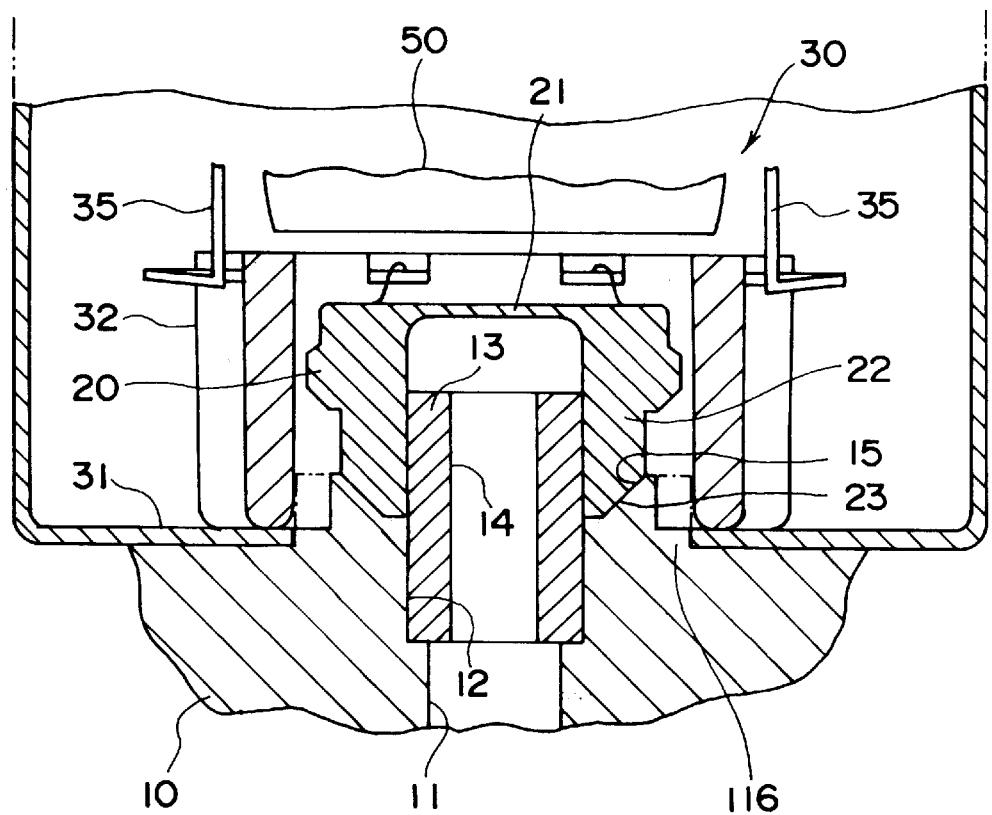
FIG. 22 is a vertical cross sectional view showing a modification of an engaging portion.

As shown in FIG. 22, a step portion 116 may be formed on a basement of outside the tapered surface 15 being fitted from inside to the periphery of the bottom opening of the case 31 as the engaging portion provided to the fitting 10 for engaging the case 31.

However, the base member 32 and the tip end of the welding machine are possible to be interfered by the step portion 116 in accordance with its size and dimension error. Further, since the stress caused in bolting the fitting 10 can be caused to the step portion 116, a part of the stress exerts an influence on the diaphragm 21 provided not far from the step portion 116 and each effect for preventing interference and stress strain can be difficult to be obtained.

Further, as shown in a single dotted line in FIG. 22, the outer diameter of the basement portion (a portion of which upper surface is the tapered surface 15) on which the pressure-detecting module 20 is mounted may be made sufficiently larger than the pressure-detecting module 20. And the circumference of the bottom opening of the case 31 may be fitted to the outer circumference of the basement portion, instead of providing the step portion 116. The circumference of the basement portion can be the engaging portion of the present invention. However, the effect of the locating groove 16, that is, preventing the interference and the stress strain, can be difficult to be obtained.

[Holder]

The case 31 of the aforementioned embodiment has the holder for holding the circuit substrate 33 to the case 31. The structure of the holder is not restricted to be made of the supporting portion 37 and the contact portion 38, but any structure can be adopted as long as the circuit substrate 33 can be retained at an appropriate disposition.

However, the holder is not requisite to the present invention but may be omitted in applying to practical use.

[Connector]

Though the connector 34 is used as a member for forming the exterior of the pressure sensor 1, a resin-made covering member may be used to form the exterior of the pressure sensor, when the electric signal is outputted to the outside through a cable or the like and the connector is not necessary, for example.

Figure 23:
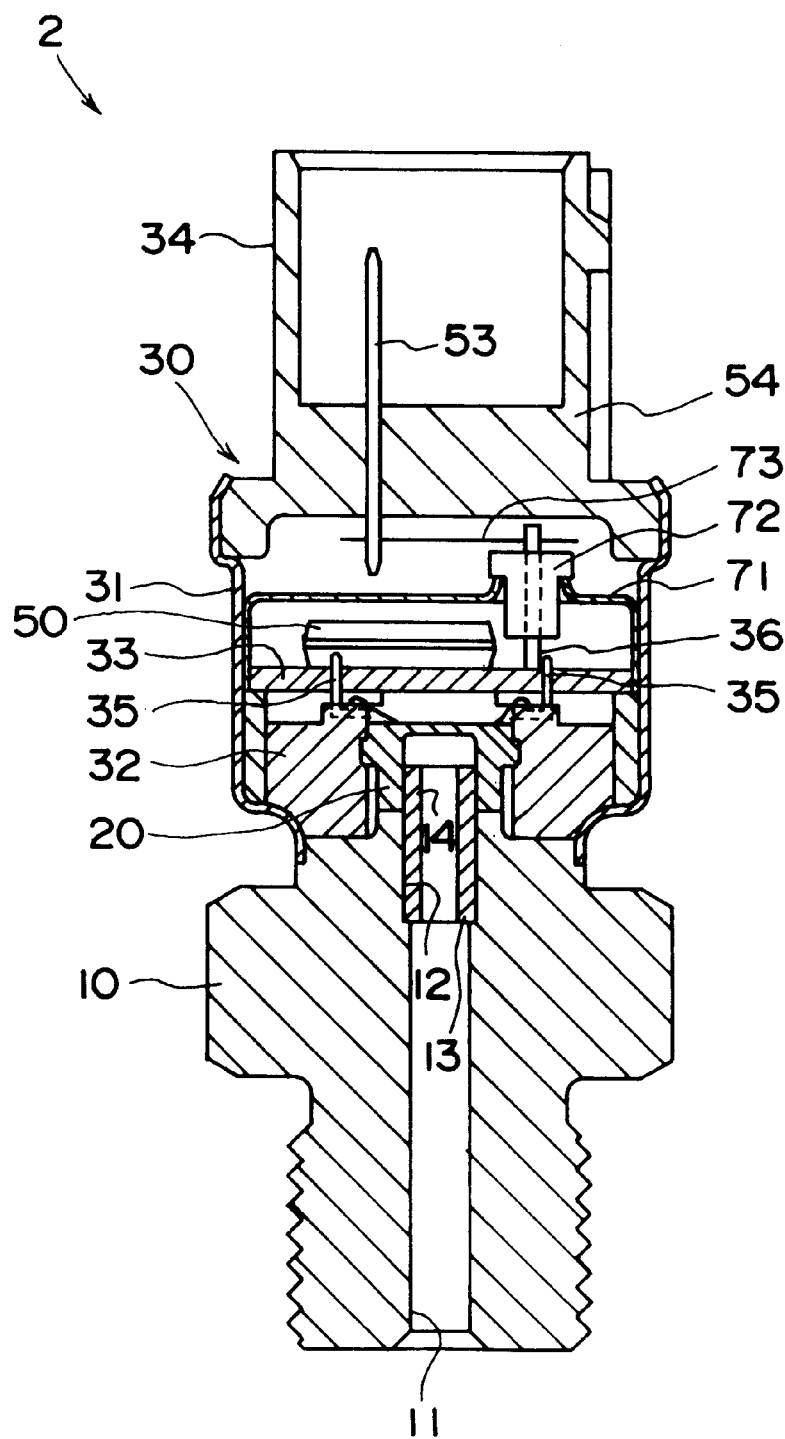
FIG. 23 is a vertical cross sectional view showing an example of a disposition of a substrate provided adjacent to the pressure-detecting module.
Figure 24:
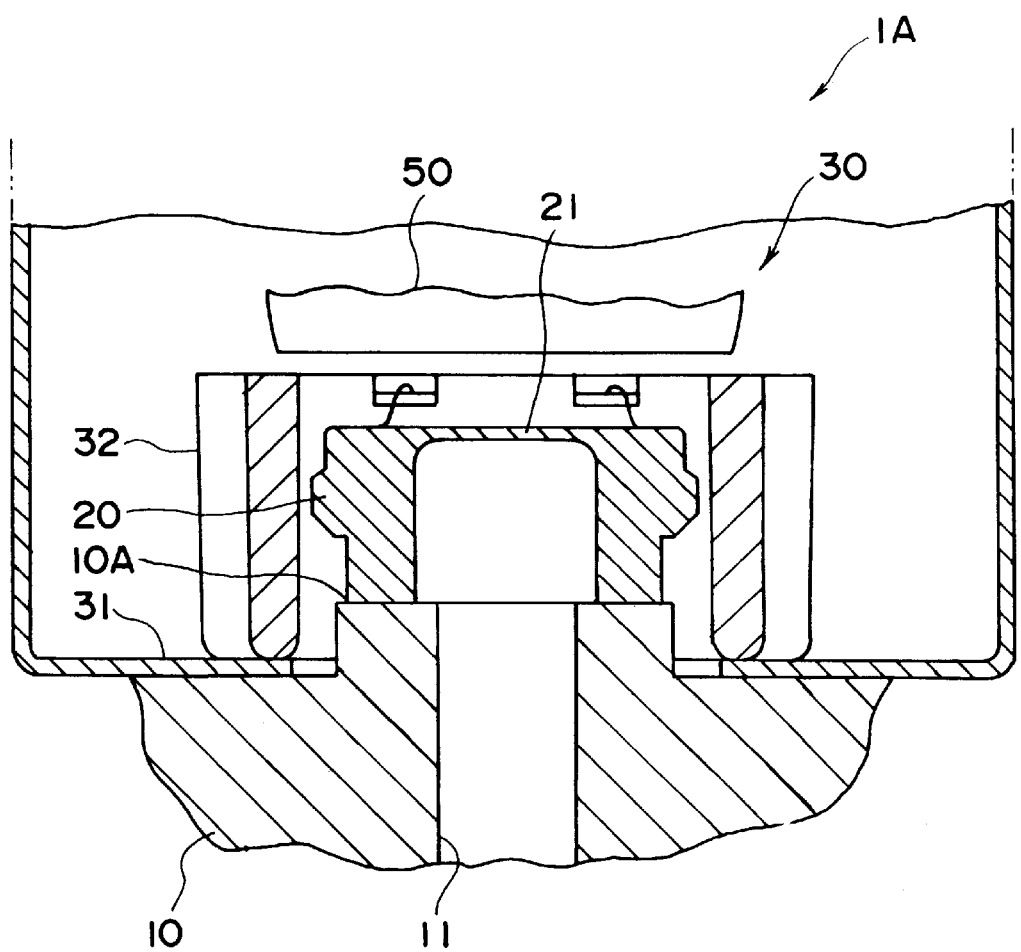
FIG. 24 is a vertical cross sectional view showing a related art.

The present invention includes modification such as another embodiment shown in FIG. 23.

The pressure-detecting module 20 and the circuit substrate 33 of a pressure sensor 2 are not so spaced apart as compared to the above-described embodiment and the electric circuit component is not installed on the lower side of the circuit substrate 33. Only an electric circuit component of small height may be installed. The present invention includes a structure in which the electric circuit component is not installed on the lower side of the circuit substrate 33.

The connector 34 of the pressure sensor 2 does not work as a covering member. An intermediate portion of the connector 34 is provided with an exterior of a cylindrical case 31, of which upper end is crimped to join the connector 34. There is no locating groove 16 and a lower end of the case 31 is welded to the fitting 10.

The electric circuit components 50 is electromagnetically shielded by the case 31 and the cover 71 abutted to the case 31. The cover 71 has a feedthrough capacitor 72, through which the second terminal 36 is pulled out to an upper side (outside of the case 31 and the cover 71) of the cover 71. A linear output terminal 53 is connected to the second terminal 36 through a FPC (flexible printed circuit) 73 to be connected to the connector 34. Each component is different from the above-described embodiment, however, the present invention can be materialized by the above structure.

[Usage]

The pressure sensor shown in the above-described embodiment is for an automobile and is specifically used for detecting a hydraulic pressure of a brake. However, the present invention is not restricted to the specific usage but can be applied for any machines such as an vessel, a construction machine and a refrigerator and can be used for detecting any fluid pressure, such as air pressure and water pressure.

What is claimed is:

1. A pressure sensor for detecting a fluid pressure, comprising: a fitting having a pressure port, a pressure-detecting module attached to an end of the pressure port and an output device electrically connected to the pressure-detecting module to output an electric signal in accordance with the pressure introduced from the pressure port, wherein the output device includes a circuit substrate spaced apart from the pressure-detecting module, a base member disposed around the pressure-detecting module and fixed to the fitting and a terminal having a first end fixed to the base member and a second end connected to the circuit substrate, and wherein the terminal has an elastically deformable portion at an intermediate part thereof between the first end and the second end.

2. The pressure sensor according to claim 1, wherein the elastically deformable portion is supported by either one of the first end and the second end in a cantilever fashion.

3. The pressure sensor according to claim 1, wherein the terminal is soldered while at least one of the first end and the second end is inserted into an opening of an object to be connected, and includes a collar portion abutted to an adjacent portion of the opening around the inserted end.

4. The pressure sensor according to claim 1, wherein the first end has a wiring portion for wire-bonding to the pressure-detecting module.

5. The pressure sensor according to claim 4, wherein the wiring portion is buried into the base member with the wiring portion being exposed.

6. The pressure sensor according to claim 2, wherein the base member is made of resin, and wherein the terminal is insert-molded to the base member.

7. The pressure sensor according to claim 1, further comprising a metal case attached to the fitting to cover the pressure-detecting module and a resin-made covering member attached to the fitting to cover the case, wherein the fitting is made of a metal.

8. The pressure sensor according to claim 7, wherein an electric circuit component electrically connected to the pressure-detecting module is installed on the circuit substrate, and wherein the case is attached to the fitting to cover the electric circuit component.

9. The pressure sensor according to claim 8, wherein the electric circuit component installed on the circuit substrate and the pressure-detecting module are electrically connected through the terminal provided to the resin-made base member inside the case.

10. The pressure sensor according to claim 7, wherein the metal case has an opening for taking out an output signal, the opening being covered by the circuit substrate.

11. The pressure sensor according to claim 10, wherein the circuit substrate has a conductive layer covering approximately the entire surface of the opening, the conductive layer being an electromagnetically shielding layer electrically connected to the case.

12. The pressure sensor according to claim 1, further comprising a metal fitting having a thin crimping portion, a case attached to the fitting to cover the pressure-detecting module, a resin-made covering member covering the case and attached to the fitting by crimping the crimping portion, wherein an outside of the case is opposed adjacently to an inside of the covering member at a position corresponding to the crimping portion.

13. The pressure sensor according to claim 12, wherein the case includes a projection protruding in an attaching direction of the base member, and wherein the base member has an inserting portion for the projection to be inserted.

14. The pressure sensor according to claim 1, further comprising the pressure-detecting module welded to an end of the pressure port provided to the fitting and an electromagnetically shielding case attached to the fitting to cover the electric circuit components electrically connected to the pressure-detecting module, wherein the fitting has an engaging portion for engaging the case to determine the location thereof.

15. The pressure sensor according to claim 14, wherein the engaging portion has an approximately concave cross section depressed relative to an attachment surface of the case, and the case has a projecting portion to be engaged to the engaging portion.

16. The pressure sensor according to claim 15, wherein the fitting bolts to an attachment portion of an object, and wherein the engaging portion is a circular groove provided around a weld portion for the pressure-detecting module to be welded.

17. The pressure sensor according to claim 16, wherein a deeper portion of the circular groove includes a bored portion along a radial direction of the pressure port.

18. The pressure sensor according to claim 1, wherein the case includes a holder for holding the circuit substrate.

19. The pressure sensor according to claim 12, wherein the covering member is used as a connector, the connector having a connector body attached to the fitting and an output terminal penetrating the connector body from an inside thereof to the outside.

20. The pressure sensor according to claim 12, wherein the covering member is used as a connector, the connector having a connector body attached to the fitting and a receiving member attached to the inside of the connector body, the receiving member being supported by the case at a back side thereof relative to an attaching direction to the connector body.

21. A pressure sensor for detecting a fluid pressure, comprising a fitting having a pressure port, a pressure-detecting module attached to an end of the pressure port and an output device electrically connected to the pressure-detecting module to output an electric signal in accordance with the pressure introduced from the pressure port, wherein the output device includes a circuit substrate spaced apart from the pressure-detecting module, a base member disposed around the pressure-detecting module and fixed to the fitting and a terminal having a first end secured to the base member and a second end connected to the circuit substrate, and wherein the terminal has an elastically deformable portion at an intermediate part between the first end and the second end, the elastically deformable portion being bent in an approximately crank-shape between the first end and the second end.

22. A pressure sensor for detecting a fluid pressure, comprising:

a fitting having a pressure port;

a pressure-detecting module including a strain gauge attached to an end of the pressure port;

a circuit substrate spaced apart from the pressure-detecting module;

a base member disposed about the pressure-detecting module and secured to the fitting; and a terminal having a first end secured to the base member, a second end connected to the circuit substrate, and an elastically deformable portion at an intermediate part thereof, whereby the elastically deformable portion reduces stress at the second end connected to the circuit substrate.

23. The pressure sensor according to claim 22, wherein soldering connects the second end of the terminal to the circuit substrate by forming a soldered part, and the elastically deformable portion prevents deterioration of the soldered part by reducing the stress applied to the soldered part due to changes in circumambient temperature of the pressure sensor, thus enabling the pressure sensor to function over a range of circumambient temperatures.

* * * * *